(12) United States Patent
Zhou et al.

(10) Patent No.: US 12,056,857 B2
(45) Date of Patent: Aug. 6, 2024

(54) DIGITAL IMAGE INPAINTING UTILIZING PLANE PANOPTIC SEGMENTATION AND PLANE GROUPING

(71) Applicant: Adobe Inc., San Jose, CA (US)

(72) Inventors: Yuqian Zhou, Urbana, IL (US);
Connelly Barnes, Seattle, WA (US);
Sohrab Amirghodsi, Seattle, WA (US);
Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 403 days.

(21) Appl. No.: 17/520,249

(22) Filed: Nov. 5, 2021

(65) Prior Publication Data

US 2023/0141734 A1    May 11, 2023

(51) Int. Cl.
  *G06K 9/00*    (2022.01)
  *G06F 18/22*   (2023.01)
  *G06N 3/02*    (2006.01)
  *G06T 5/77*    (2024.01)
  *G06T 7/11*    (2017.01)
  *G06T 11/00*   (2006.01)

(52) U.S. Cl.
  CPC ............... *G06T 5/77* (2024.01); *G06F 18/22* (2023.01); *G06N 3/02* (2013.01); *G06T 7/11* (2017.01); *G06T 11/00* (2013.01); *G06T 2207/20084* (2013.01)

(58) Field of Classification Search
  CPC ... G06T 5/77; G06T 7/11; G06T 11/00; G06T 2207/20084; G06F 18/22; G06N 3/02; G06N 3/0464; G06N 3/09; G06V 10/26; G06V 20/70; G06V 10/82
  See application file for complete search history.

(56) References Cited

U.S. PATENT DOCUMENTS

| 11,551,429 | B2* | 1/2023 | Rong | G06N 3/04 |
| 11,627,318 | B2* | 4/2023 | Danielsson | H04N 19/17 |
| | | | | 348/143 |
| 11,887,310 | B2* | 1/2024 | Jagadeesh | G06N 20/00 |
| 2021/0158043 | A1* | 5/2021 | Hou | G06V 10/454 |

(Continued)

OTHER PUBLICATIONS

Liu et al ("PanDA: Panoptic Data Augmentation", California Institute of Technology, Pasadena CA 91125, USA, Apr. 4, 2020) (Year: 2020).*

(Continued)

*Primary Examiner* — Shervin K Nakhjavan
(74) *Attorney, Agent, or Firm* — Keller Preece PLLC

(57) ABSTRACT

The present disclosure relates to systems, methods, and non-transitory computer readable media for accurately generating inpainted digital images utilizing a guided inpainting model guided by both plane panoptic segmentation and plane grouping. For example, the disclosed systems utilize a guided inpainting model to fill holes of missing pixels of a digital image as informed or guided by an appearance guide and a geometric guide. Specifically, the disclosed systems generate an appearance guide utilizing plane panoptic segmentation and generate a geometric guide by grouping plane panoptic segments. In some embodiments, the disclosed systems generate a modified digital image by implementing an inpainting model guided by both the appearance guide (e.g., a plane panoptic segmentation map) and the geometric guide (e.g., a plane grouping map).

20 Claims, 12 Drawing Sheets

(56) References Cited

U.S. PATENT DOCUMENTS

| | | | |
|---|---|---|---|
| 2021/0279866 A1* | 9/2021 | Svekolkin | G06V 10/454 |
| 2023/0063150 A1* | 3/2023 | Tu | G06T 5/70 |
| 2023/0222671 A1* | 7/2023 | Kim | G06T 7/20 |
| | | | 382/103 |

OTHER PUBLICATIONS

Dundar et al ("Panoptic-based Image Synthesis", NVIDIA Corporation, Proceedings of the IEEE/CVF Conference on Computer Vision and Pattern Recognition (CVPR), 2020, pp. 8070-8079) (Year: 2020).*

Liu et al ("An End-to-End Network for Panoptic Segmentation" Proceedings of the IEEE/CVF Conference on Computer Vision and Pattern Recognition (CVPR), 2019, pp. 6172-6181) (Year: 2019).*

J.-B. Huang, S. B. Kang, N. Ahuja, and J. Kopf, "Image completion using planar structure guidance," ACM Transactions on graphics (TOG), vol. 33, No. 4, pp. 1-10, 2014.

M. Bertalmio, G. Sapiro, V. Caselles, and C. Ballester, "Image inpainting," in Proceedings of the 27th annual conference on Computer graphics and interactive techniques, pp. 417-424, 2000.

C. Ballester, M. Bertalmio, V. Caselles, G. Sapiro, and J. Verdera, "Filling-in by joint interpolation of vector fields and gray levels," IEEE transactions on image processing, vol. 10, No. 8, pp. 1200-1211, 2001.

Y. Wexler, E. Shechtman, and M. Irani, "Space-time completion of video," IEEE Transactions on pattern analysis and machine intelligence, vol. 29, No. 3, pp. 463-476, 2007. Part 1.

Y. Wexler, E. Shechtman, and M. Irani, "Space-time completion of video," IEEE Transactions on pattern analysis and machine intelligence, vol. 29, No. 3, pp. 463-476, Part 2. 2007.

C. Barnes, E. Shechtman, A. Finkelstein, and D. B. Goldman, "Patchmatch: A ran-domized correspondence algorithm for structural image editing," ACM Trans. Graph., vol. 28, No. 3, p. 24, 2009.

D. Pathak, P. Krahenbuhl, J. Donahue, T. Darrell, and A. A. Efros, "Context encoders: Feature learning by inpainting," in Proceedings of the IEEE conference on computer vision and pattern recognition, pp. 2536-2544, 2016.

S. Iizuka, E. Simo-Serra, and H. Ishikawa, "Globally and locally consistent image completion," ACM Transactions on Graphics (ToG), vol. 36, No. 4, pp. 1-14, 2017.

G. Liu, F. A. Reda, K. J. Shih, T.-C. Wang, A. Tao, and B. Catanzaro, "Image inpainting for irregular holes using partial convolutions," in Proceedings of the European Conference on Computer Vision (ECCV), pp. 85-100, 2018.

J. Yu, Z. Lin, J. Yang, X. Shen, X. Lu, and T. S. Huang, "Free-form image inpainting with gated convolution," in Proceedings of the IEEE/CVF International Conference on Computer Vision, pp. 4471-4480, 2019.

K. Nazeri, E. Ng, T. Joseph, F. Qureshi, and M. Ebrahimi, "Edgeconnect: Generative image inpainting with adversarial edge learning," 2019.

Y. Song, C. Yang, Y. Shen, P. Wang, Q. Huang, and C.-C. J. Kuo, "Spg-net: Seg-mentation prediction and guidance network for image inpainting," arXiv preprint arXiv:1805.03356, 2018.

Y. Ren, X. Yu, R. Zhang, T. H. Li, S. Liu, and G. Li, "Structureflow: Image inpainting via structure-aware appearance flow," in IEEE International Conference on Computer Vision (ICCV), 2019.

L. Liao, J. Xiao, Z. Wang, C.-w. Lin, and S. Satoh, "Guidance and evaluation: Semantic-aware image inpainting for mixed scenes," arXiv preprint arXiv:2003.06877, 2020.

C. Zheng, T.-J. Cham, and J. Cai, "Pluralistic image completion," in Proceedings of the IEEE Conference on Computer Vision and Pattern Recognition, pp. 1438-1447, 2019.

C. Yang, X. Lu, Z. Lin, E. Shechtman, O. Wang, and H. Li, "High-resolution image in-painting using multi-scale neural patch synthesis," in Proceedings of the IEEE Conference on Computer Vision and Pattern Recognition, pp. 6721-6729, 2017.

Y. Zeng, Z. Lin, J. Yang, J. Zhang, E. Shechtman, and H. Lu, "High-resolution image inpainting with iterative confidence feedback and guided upsampling," in European Conference on Computer Vision, pp. 1-17, Springer, 2020.

Z. Yi, Q. Tang, S. Azizi, D. Jang, and Z. Xu, "Contextual residual aggregation for ultra high-resolution image inpainting," in Proceedings of the IEEE/CVF Conference on Computer Vision and Pattern Recognition, pp. 7508-7517, 2020. Part 1.

Z. Yi, Q. Tang, S. Azizi, D. Jang, and Z. Xu, "Contextual residual aggregation for ultra high-resolution image inpainting," in Proceedings of the IEEE/CVF Conference on Computer Vision and Pattern Recognition, pp. 7508-7517, 2020. Part 2.

Z. Yi, Q. Tang, S. Azizi, D. Jang, and Z. Xu, "Contextual residual aggregation for ultra high-resolution image inpainting," in Proceedings of the IEEE/CVF Conference on Computer Vision and Pattern Recognition, pp. 7508-7517, 2020. Part 3.

M. Lukac, D. Sykora, K. Sunkavalli, E. Shechtman, O. Jamriska, N. Carr, and T. Pajdla, "Nautilus: Recovering regional symmetry transformations for image editing," ACM Transactions on Graphics (TOG), vol. 36, No. 4, pp. 1-11, 2017. Part 1.

M. Lukac, D. Sykora, K. Sunkavalli, E. Shechtman, O. Jamriska, N. Carr, and T. Pajdla, "Nautilus: Recovering regional symmetry transformations for image editing," ACM Transactions on Graphics (TOG), vol. 36, No. 4, pp. 1-11, 2017. Part 2.

M. Lukac, D. Sykora, K. Sunkavalli, E. Shechtman, O. Jamriska, N. Carr, and T. Pajdla, "Nautilus: Recovering regional symmetry transformations for image editing," ACM Transactions on Graphics (TOG), vol. 36, No. 4, pp. 1-11, 2017. Part 3.

C. Cao and Y. Fu, "Learning a sketch tensor space for image inpainting of man-made scenes," arXiv preprint arXiv:2103.15087, 2021.

Z. Wan, J. Zhang, D. Chen, and J. Liao, "High-fidelity pluralistic image completion with transformers," arXiv preprint arXiv:2103.14031, 2021.

C. Liu, J. Yang, D. Ceylan, E. Yumer, and Y. Furukawa, "Planenet: Piece-wise planar reconstruction from a single rgb image," in Proceedings of the IEEE Conference on Computer Vision and Pattern Recognition, pp. 2579-2588, 2018.

C. Liu, K. Kim, J. Gu, Y. Furukawa, and J. Kautz, "Planercnn: 3d plane detection and reconstruction from a single image," in Proceedings of the IEEE/CVF Conference on Computer Vision and Pattern Recognition, pp. 4450-4459, 2019.

A. Kirillov, K. He, R. Girshick, C. Rother, and P. Dollar, "Panoptic segmentation," in Proceedings of the IEEE/CVF Conference on Computer Vision and Pattern Recognition, pp. 9404-9413, 2019.

D. Deng, Z. Chen, and B. E. Shi, "Multitask emotion recognition with incomplete labels," in 2020 15th IEEE International Conference on Automatic Face and Gesture Recognition (FG 2020), pp. 592-599, IEEE, 2020.

Y. Zhou, J. Huang, X. Dai, S. Liu, L. Luo, Z. Chen, and Y. Ma, "Holicity: A city-scale data platform for learning holistic 3d structures," arXiv preprint arXiv:2008.03286, 2020.

Y. Zhu, Y. Tian, D. Metaxas, and P. Dollar, "Semantic amodal segmentation," in Proceedings of the IEEE conference on computer vision and pattern recognition, pp. 1464-1472, 2017.

A. Dai, A. X. Chang, M. Savva, M. Halber, T. Funkhouser, and M. Nießner, "Scannet: Richly-annotated 3d reconstructions of indoor scenes," in Proceedings of the IEEE conference on computer vision and pattern recognition, pp. 5828-5839, 2017.

Z. Li, T.-W. Yu, S. Sang, S. Wang, M. Song, Y. Liu, Y.-Y. Yeh, R. Zhu, N. Gundavarapu, J. Shi, et al., "Openrooms: An open framework for photorealistic indoor scene datasets," in Proceedings of the IEEE/CVF Conference on Computer Vision and Pattern Recognition, pp. 7190-7199, 2021. Part 1.

Z. Li, T.-W. Yu, S. Sang, S. Wang, M. Song, Y. Liu, Y.-Y. Yeh, R. Zhu, N. Gundavarapu, J. Shi, et al., "Openrooms: An open framework for photorealistic indoor scene datasets," in Proceedings of the IEEE/CVF Conference on Computer Vision and Pattern Recognition, pp. 7190-7199, 2021. Part 2.

Z. Li, M. Shafiei, R. Ramamoorthi, K. Sunkavalli, and M. Chandraker, "Inverse rendering for complex indoor scenes: Shape, spatially-

(56) References Cited

OTHER PUBLICATIONS varying lighting and svbrdf from a single image," in Proceedings of the IEEE/CVF Conference on Computer Vision and Pattern Recognition, pp. 2475-2484, 2020.
T.-Y. Lin, M. Maire, S. Belongie, J. Hays, P. Perona, D. Ramanan, P. Dollar, and C. L. Zitnick, "Microsoft coco: Common objects in context," in European conference on computer vision, pp. 740-755, Springer, 2014.
B. Zhou, H. Zhao, X. Puig, S. Fidler, A. Barriuso, and A. Torralba, "Scene parsing through ade20k dataset," in Proceedings of the IEEE conference on computer vision and pattern recognition, pp. 633-641, 2017.
M. Cordts, M. Omran, S. Ramos, T. Rehfeld, M. Enzweiler, R. Benenson, U. Franke, S. Roth, and B. Schiele, "The cityscapes dataset for semantic urban scene understanding," in Proceedings of the IEEE conference on computer vision and pattern recognition, pp. 3213-3223, 2016.
K. He, G. Gkioxari, P. Dollar, and R. Girshick, "Mask r-cnn," in Proceedings of the IEEE international conference on computer vision, pp. 2961-2969, 2017.
Y. Li, H. Zhao, X. Qi, L. Wang, Z. Li, J. Sun, and J. Jia, "Fully convolutional networks for panoptic segmentation," in Proceedings of the IEEE/CVF Conference on Computer Vision and Pattern Recognition, pp. 214-223, 2021.
E. Xie, W. Wang, Z. Yu, A. Anandkumar, J. M. Alvarez, and P. Luo, "Segformer: Simple and efficient design for semantic segmentation with transformers," arXiv preprint arXiv:2105.15203, 2021.
B. Cheng, A. G. Schwing, and A. Kirillov, "Per-pixel classification is not all you need for semantic segmentation," arXiv preprint arXiv:2107.06278, 2021.
R. Toldo and A. Fusiello, "Robust multiple structures estimation with j-linkage," in European conference on computer vision, pp. 537-547, Springer, 2008.
Y. Zhou, H. Qi, J. Huang, and Y. Ma, "Neurvps: neural vanishing point scanning via conic convolution," arXiv preprint arXiv:1910.06316, 2019.
J.-B. Huang, A. Singh, and N. Ahuja, "Single image super-resolution from transformed self-exemplars," in Proceedings of the IEEE conference on computer vision and pattern recognition, pp. 5197-5206, 2015.
P. Denis, J. H. Elder, and F. J. Estrada, "Efficient edge-based methods for estimating manhattan frames in urban imagery," in European conference on computer vision, pp. 197-210, Springer, 2008.
K. Chaudhury, S. DiVerdi, and S. Ioffe, "Auto-rectification of user photos," in 2014 IEEE International Conference on Image Processing (ICIP), pp. 3479-3483, IEEE, 2014.
S. Zhao, J. Cui, Y. Sheng, Y. Dong, X. Liang, E. I. Chang, and Y. Xu, "Large scale image completion via co-modulated generative adversarial networks," in International Conference on Learning Representations (ICLR), 2021.
C. Zheng, T.-J. Cham, and J. Cai, "Tfill: Image completion via a transformer-based architecture," arXiv preprint arXiv:2104.00845, 2021.
Y. Wu, A. Kirillov, F. Massa, W.-Y. Lo, and R. Girshick, "Detectron2." https://github.com/facebookresearch/detectron2, 2019.
F. Kluger, E. Brachmann, H. Ackermann, C. Rother, M. Y. Yang, and B. Rosenhahn, "Consac: Robust multi-model fitting by conditional sample consensus," in Proceedings of the IEEE/CVF conference on computer vision and pattern recognition, pp. 4634-4643, 2020.

\* cited by examiner

DIGITAL IMAGE INPAINTING UTILIZING PLANE PANOPTIC SEGMENTATION AND PLANE GROUPING

BACKGROUND

Recent years have seen significant developments in software and hardware platforms for digital image inpainting to reconstruct missing or flawed regions of digital images. Indeed, some digital image editing applications utilize inpainting models to fill missing or flawed regions of pixels with a plausible result. For example, many existing digital image editing systems utilize patch-based approaches to borrow example pixels from other portions of a digital image to fill holes of missing pixels. Other digital image editing systems fill regions of digital images by implementing deep-learning networks that learn image distributions by training over large datasets. Despite these advancements, conventional digital image editing systems continue to experience a number of deficiencies or disadvantages, particularly with regard to the challenging inpainting case of filling holes on planes with obvious regularity in appearance (particularly non frontal-parallel planes). Indeed, in this case and others, existing systems often generate inaccurate inpainted images by filling holes with pixels that do not visually align with surrounding image portions and that appear jarring or out of place.

SUMMARY

One or more embodiments described herein provide benefits and solve one or more of the foregoing or other problems in the art with systems, methods, and non-transitory computer readable media that accurately generate inpainted digital images utilizing an inpainting model guided by both plane panoptic segmentation and plane grouping. Using the techniques and methods described herein, the disclosed systems improve the accuracy of image inpainting by utilizing a guided inpainting model to fill holes of missing pixels of a digital image as informed or guided by an appearance guide and a geometric guide. Specifically, the disclosed systems generate an appearance guide utilizing plane panoptic segmentation to identify different semantic classes, instance identifications, and surface planes within a digital image. Additionally, the disclosed systems generate a geometric guide by grouping plane panoptic segments (or surface planes) according to line clustering and determining normal vectors (or other techniques). In some embodiments, the disclosed systems generate a modified digital image by implementing an inpainting model guided by both the appearance guide (e.g., a plane panoptic segmentation map) and the geometric guide (e.g., a plane grouping map). By implementing a dual-guided technique with both an appearance guide and a geometric guide to inform the inpainting process, the disclosed systems exhibit accuracy improvements especially for the case of image completion for image portions depicting repeating patterns.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
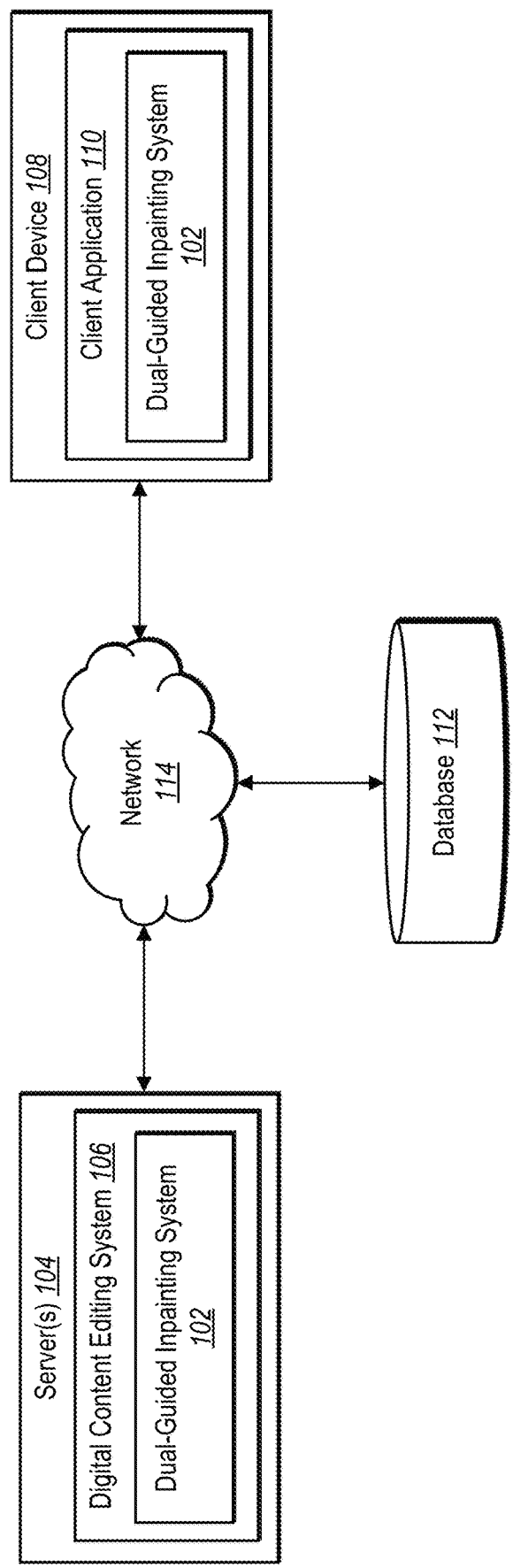
FIG. 1 illustrates an example system environment in which a dual-guided inpainting system operates in accordance with one or more embodiments.

One or more embodiments described herein include a dual-guided inpainting system that accurately and flexibly generates inpainted digital images utilizing an inpainting model guided by a plane panoptic segmentation map and a plane grouping map. In practical settings, inpainting digital images that depict man-made (or other) structures with repeating patterns presents a challenge because such deterministic structures with holes of missing pixels are especially easy to identify as out place if filled with poorly matched pixels. To address this challenge, in some embodiments, the dual-guided inpainting system utilizes an appearance guide and a geometry guide to guide or inform an inpainting model for inpainting a digital image to fill one or more holes of missing pixels, especially in regions with repeating visual patterns or high regularity. For example, the dual-guided inpainting system generates an appearance guide utilizing plane panoptic segmentation. In addition, in certain embodiments, the dual-guided inpainting system generates a geometry guide utilizing plane grouping. In some cases, the dual-guided inpainting system further utilizes a guided inpainting model to sample pixels of a digital image to fill one or more holes (e.g., regions of missing or flawed pixels) as guided by both the appearance guide and the geometry guide.

As just mentioned, in one or more embodiments the dual-guided inpainting system generates an appearance guide for guiding an inpainting model to fill holes in a digital image. For example, the dual-guided inpainting system generates an appearance guide in the form of a plane panoptic segmentation map. In some cases, the dual-guided inpainting system generates a plane panoptic segmentation map by utilizing a plane panoptic segmentation model to determine surface planes and panoptic segments associated with pixels of a digital image. For instance, the dual-guided inpainting system utilizes the plane panoptic segmentation model to determine, for a pixel within a particular plane panoptic segment of a digital image, a triplet label that indicates a semantic class associated with the plane panoptic segment, an instance identification associated with the plane panoptic segment, and a surface plane identification associated with the plane panoptic segment.

To elaborate, in some embodiments, the dual-guided inpainting system generates plane panoptic segments by combining panoptic segments and surface plane segments for a digital image. For example, the dual-guided inpainting system utilizes a panoptic segmentation model (as part of a plane panoptic segmentation model) to generate panoptic segments that indicate semantic classes of objects depicted within the digital image and that further indicate different instances of the semantic classes. In addition to the panoptic segments, in one or more embodiments, the dual-guided inpainting system also generates surface plane segments for a digital image. For instance, the dual-guided inpainting system utilizes a plane detection model (as part of a plane panoptic segmentation model) trained on one or more datasets to detect or determine surface planes within a digital image. In certain embodiments, the dual-guided inpainting system further determines different surface plane segments for different instances of a single plane label. Additionally, in some embodiments, the dual-guided inpainting system combines the surface plane segments and the panoptic segments to form a plane panoptic segmentation map of plane panoptic segments depicting edges or boundaries between different structures of surface planes and/or instances of semantic classes.

As also mentioned, in some embodiments, the dual-guided inpainting system generates a geometry guide for guiding an inpainting model to fill holes in a digital image. For instance, the dual-guided inpainting system generates a geometry guide in the form of a plane grouping map. In certain cases, the dual-guided inpainting system generates a plane grouping map by grouping plane panoptic segments from a plane panoptic segmentation map. For example, the dual-guided inpainting system groups plane panoptic segments into surface plane groups by determining and comparing normal vectors associated with (surface planes of) the plane panoptic segments. In certain cases, the dual-guided inpainting system also (or alternatively) clusters lines within a digital image according to distinct vanishing points and determines normal vectors for surface planes indicated by the clusters of lines.

In one or more embodiments, the dual-guided inpainting system utilizes a guided inpainting model to fill one or more holes of missing or flawed pixels within a digital image. For example, the dual-guided inpainting system utilizes a guided inpainting model guided by the appearance guide (e.g., the plane panoptic segmentation map) together with the geometry guide (e.g., the plane grouping map). In some cases, the dual-guided inpainting system implements the guided inpainting model according to one or more optimization algorithms that inform or encourage sampling particular patches a digital image to fill a hole. For instance, the dual-guided inpainting system utilizes an appearance guidance optimization algorithm to sample patches according to structure separation indicated by a plane panoptic segmentation map. In certain embodiments, the dual-guided inpainting system also (or alternatively) utilizes a regularity optimization algorithm to sample patches according to different regularity modes (e.g., offset vectors from a target patch indicating sample patches).

As mentioned, conventional digital image editing systems exhibit a number of drawbacks, particularly in accuracy. To elaborate, existing systems often generate inaccurate inpainted digital images by filling holes with pixels that are poorly matched to surrounding pixels, especially when filling holes in regions with regular, repeating patterns. For example, due to their limitations, some prior systems sample pixels from regions of a digital image that are not cohesive with the region of pixels surrounding a hole, and the resulting inpainted image is often visually jarring. Even conventional systems that employ deep learning techniques to fill holes are nevertheless limited by available training data, which similarly results in filling holes with pixels that appear out of place.

As suggested above, embodiments of the dual-guided inpainting system provides several improvements or advantages over conventional digital image editing systems. For example, embodiments of the dual-guided inpainting system provides improved accuracy over conventional systems. Compared to conventional systems that inaccurately fill holes with poorly matched pixels, the dual-guided inpainting system utilizes a guided inpainting model informed by an appearance guide (e.g., a plane panoptic segmentation map) and a geometry guide (e.g., a plane grouping map) to fill holes of missing pixels more accurately. For example, the dual-guided inpainting system samples patches from a digital image to fill a hole based on the appearance of different patches throughout the digital image and further based on geometric structures identified throughout the digital image. Indeed, some embodiments of the dual-guided inpainting system utilize specific optimization algorithms such as an appearance guidance optimization algorithm, a geometry guidance optimization algorithm, and/or a regularity optimization algorithm to guide the sampling of patches in a digital image to fill holes based on the appearance guide and/or the geometry guide.

Additional detail regarding the dual-guided inpainting system will now be provided with reference to the figures. For example, FIG. 1 illustrates a schematic diagram of an example system environment for implementing a dual-guided inpainting system 102 in accordance with one or more embodiments. An overview of the dual-guided inpainting system 102 is described in relation to FIG. 1. Thereafter, a more detailed description of the components and processes of the dual-guided inpainting system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 11.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single client device 108, in some embodiments the environment includes multiple different client devices, each associated with a different user (e.g., a digital image editor). The client device 108 communicates with the server(s) 104 via the network 114. For example, the client device 108 receives user input from a user interacting with the client device 108 (e.g., via the client application 110) to, for instance, generate an inpainted digital image. In some cases, the client device 108 receives user input via the client application 110 to indicate a digital image and/or a hole to fill within a digital image. Thus, the dual-guided inpainting system 102 on the server(s) 104 receives information or instructions to generate an inpainted digital image by filling one or more holes of a digital image utilizing a guided inpainting model as guided by an appearance guide and/or a geometry guide (where the digital image, the guided inpainting model, the appearance guide and/or the geometry guide are stored within the database 112).

As shown, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including a digital image editing interface. In some cases, a user interacts with the client application 110 to provide user input to perform operations as mentioned above, such as generating in inpainted digital image by filling one or more holes utilizing a guided inpainting model.

As illustrated in FIG. 1, the environment includes the server(s) 104. The server(s) 104 generates, tracks, stores, processes, receives, and transmits electronic data, such as digital images, a deep inpainting model, a guided inpainting model, and a plane panoptic segmentation model (including a panoptic segmentation model and a plane detection model). For example, the server(s) 104 receives data from the client device 108 in the form of an indication of a user interaction to generate an inpainted digital image. In addition, the server(s) 104 transmits data to the client device 108 to provide an inpainted digital image (e.g., for display within a graphical user interface). Indeed, the server(s) 104 communicates with the client device 108 to transmit and/or receive data via the network 114. In some embodiments, the server(s) 104 comprises a distributed server where the server(s) 104 includes a number of server devices distributed across the network 114 and located in different physical locations. The server(s) 104 comprises a digital image server, a content server, an application server, a communication server, a web-hosting server, a multidimensional server, or a machine learning server.

As further shown in FIG. 1, the server(s) 104 also includes the dual-guided inpainting system 102 as part of a digital content editing system 106. The digital content editing system 106 communicates with the client device 108 to perform various functions associated with the client application 110 such as storing and managing a repository of digital images, generating inpainted digital images, and providing inpainted digital images for display. For example, the dual-guided inpainting system 102 communicates with the database 112 to access digital images, a plane panoptic segmentation model, and a guided inpainting model used to fill holes of missing pixels within digital images. Indeed, as further shown in FIG. 1, the environment includes a database 112. In particular, the database 112 stores information such as digital images, appearance guides, geometry guides, a plane panoptic segmentation model, a deep inpainting model, and/or a guided inpainting model.

In one or more embodiments, the server(s) 104 includes all, or a portion of, the dual-guided inpainting system 102. For example, the dual-guided inpainting system 102 operates on the server(s) to generate inpainted digital images. In some cases, the dual-guided inpainting system 102 utilizes, locally on the server(s) 104 or from another network location (e.g., the database 112), plane panoptic segmentation model and/or a guided inpainting model to generate inpainted digital images.

In certain cases, the client device 108 includes all or part of the dual-guided inpainting system 102. For example, the client device 108 generates, obtains (e.g., download) from the server(s) 104, or utilizes one or more aspects of the dual-guided inpainting system 102, such as a deep inpainting model, a plane panoptic segmentation model (including one or more both of a panoptic segmentation model and/or a plane detection model), and/or a guided inpainting model. Indeed, in some implementations, as illustrated in FIG. 1, the dual-guided inpainting system 102 is located in whole or in part on the client device 108. For example, the dual-guided inpainting system 102 includes a web hosting application that allows the client device 108 to interact with the server(s) 104. To illustrate, in one or more implementations, the client device 108 accesses a web page supported and/or hosted by the server(s) 104.

Although FIG. 1 illustrates a particular arrangement of the environment, in some embodiments, the environment has a different arrangement of components and/or may have a different number or set of components altogether. For instance, in some embodiments, the dual-guided inpainting system 102 is implemented by (e.g., located entirely or in part on) the client device 108 and/or a third-party device. In addition, in one or more embodiments, the client device 108 communicates directly with the dual-guided inpainting system 102, bypassing the network 114. Further, in some embodiments, the database 112 is located external to the server(s) 104 (e.g., in communication via the network 114) or located on the server(s) 104 and/or on the client device 108.

Figure 2:
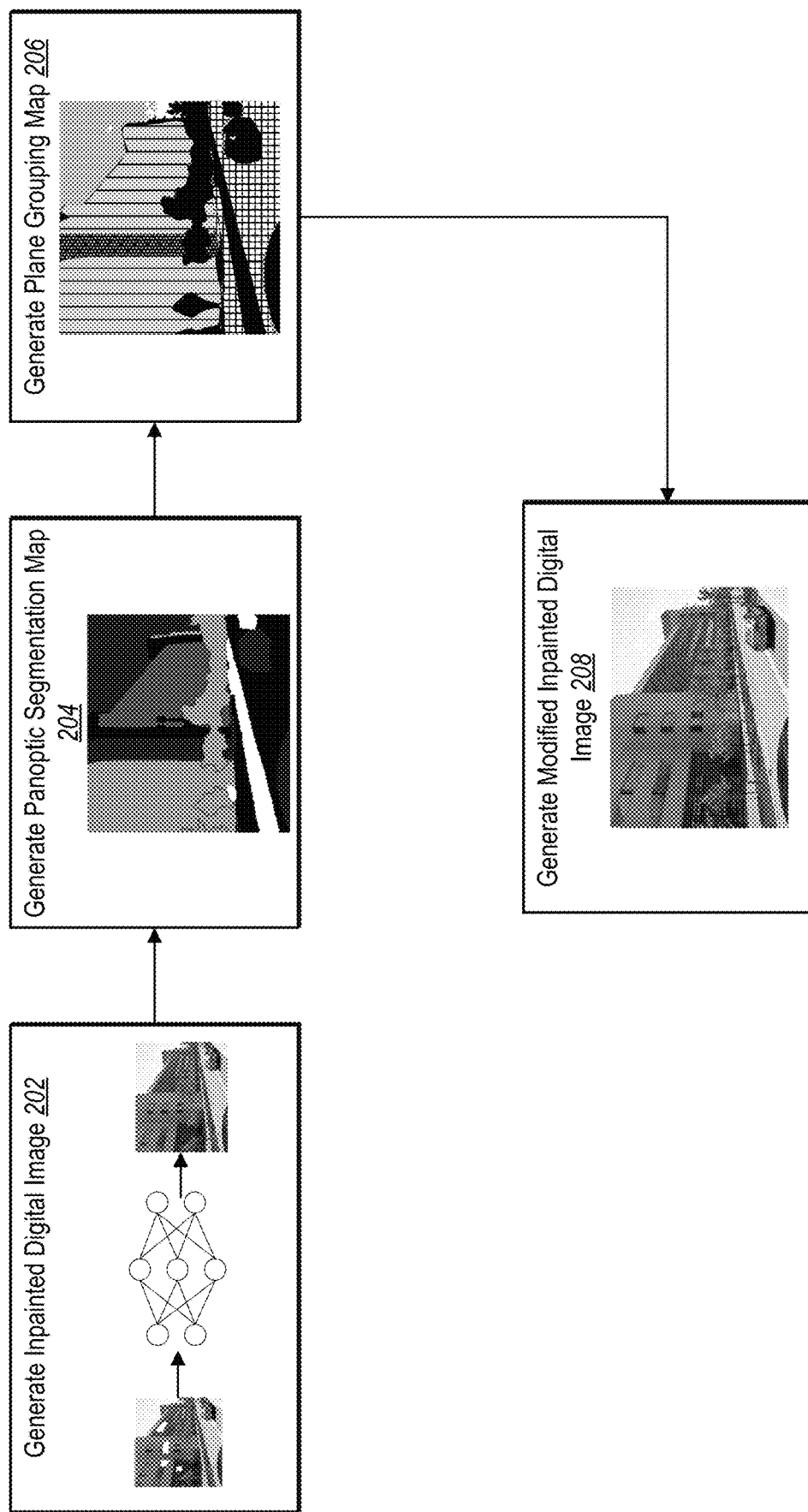
FIG. 2 illustrates an overview of generating a modified inpainted digital image utilizing a plane panoptic segmentation map and a plane grouping map in accordance with one or more embodiments.

As mentioned, in one or more embodiments, the dual-guided inpainting system 102 generates an inpainted digital image by filling one or more holes of missing or flawed pixels of a digital image. In particular, the dual-guided inpainting system 102 generates a final inpainted digital image utilizing a guided inpainting model guided by a plane panoptic segmentation map and a plane grouping map. FIG. 2 illustrates an overview of generating a final inpainted digital image utilizing a plane panoptic segmentation map and plane grouping map in accordance with one or more embodiments. Additional detail regarding the specific acts of FIG. 2 is provided below with reference to subsequent figures.

As illustrated in FIG. 2, the dual-guided inpainting system 102 performs an act 202 to generate an inpainted digital image. More specifically, the dual-guided inpainting system 102 generates a preliminary inpainted digital image from an initial digital image depicting one or more holes. For example, the dual-guided inpainting system 102 utilizes a deep inpainting model to generate the (preliminary) inpainted digital image. In some cases, the dual-guided inpainting system generates the inpainted digital image at a smaller, downsampled resolution as compared to an initial digital image and a final inpainted digital image. As used herein, a deep inpainting model refers to a machine learning model such as a neural network that generates an inpainted digital image utilizing deep learning techniques. For example, a deep inpainting model includes a deep inpainting neural network that learns parameters from sample data (e.g., sample complete digital images and sample digital images with holes) to generate inpainted digital images without holes.

A machine learning model refers to a computer algorithm or a collection of computer algorithms that automatically improve for a particular task through experience based on use of data. For example, a machine learning model utilizes one or more learning techniques to improve in accuracy and/or effectiveness. Relatedly, a neural network refers to a machine learning model that can be trained and/or tuned based on inputs to determine classifications or approximate unknown functions. For example, a neural network includes a model of interconnected artificial neurons (e.g., organized in layers) that communicate and learn to approximate complex functions and generate outputs (e.g., determinations of digital image classes or labels) based on a plurality of inputs provided to the neural network. In some cases, a neural network refers to an algorithm (or set of algorithms) that implements deep learning techniques to model high-level abstractions in data.

As further illustrated in FIG. 2, the dual-guided inpainting system 102 performs an act 204 to generate a plane panoptic segmentation map. In particular, the dual-guided inpainting system 102 generates a plane panoptic segmentation map that indicates different plane panoptic segments within the inpainted digital image. Indeed, a plane panoptic segmentation map includes plane panoptic segments that indicate triplet labels for pixels of a digital image (e.g., an inpainted digital image), including indications of semantic classes, instance identifications, and surface plane identifications. For example, a plane panoptic segment includes a representation or indication of one or more pixels (e.g., in a particular regions) of a digital image that share a common semantic class, a common instance label, and a common surface plane. In some embodiments, a plane panoptic segmentation map thus includes a visual representation of multiple plane panoptic segments associated with different regions of pixels, with visible edges or boundaries separating the different segments.

In some cases, the dual-guided inpainting system 102 utilizes a plane panoptic segmentation model to generate a plane panoptic segmentation map. As used herein, a plane panoptic segmentation model includes a machine learning model (including one or more neural networks) that generates or determines plane panoptic segments in a digital image and labels semantic classes, instance labels, and surface planes of pixels. In some cases, a plane panoptic segmentation model includes a panoptic segmentation model for generating panoptic segments and a plane detection model for detecting surface planes.

For example, the dual-guided inpainting system 102 utilizes a panoptic segmentation model such as a panoptic segmentation neural network to generate panoptic segments from a digital image. A panoptic segment can include an indication of a semantic class (e.g., a label for the type of depicted object, such as "person," "building," "tree," or "car") and an instance label (e.g., a label designating different instances of a common semantic classes, such as "car 1" and "car 2") for a given pixel of a digital image. Indeed, in some cases, the dual-guided inpainting system 102 generates panoptic segments for individual pixels of the inpainted digital image (generated via the act 202) to indicate the semantic classes and instances depicted by the pixels.

As mentioned, the dual-guided inpainting system 102 also generates surface plane segments for the inpainted digital image. A surface plane segment includes a (visual) representation or indication of a surface plane depicted within a digital image. For example, the dual-guided inpainting system 102 detects a surface plane utilizing a plane detection model such as a plane detection neural network to detect or determine different surface planes associated with different pixels of a digital image. In some cases, the dual-guided inpainting system 102 further assigns a surface plane identification to a pixel based on the surface plane where the pixel is located, as determined via the plane detection model.

In one or more embodiments, as part of the act 204 to generate a plane panoptic segmentation map, the dual-guided inpainting system 102 further combines, merges, or fuses panoptic segments and surface plane segments. More specifically, the dual-guided inpainting system 102 combines the panoptic segments and surface plane segments to generate plane panoptic segments for a plane panoptic segmentation map. For instance, the dual-guided inpainting system 102 identifies different structures depicted within a digital image (e.g., the inpainted digital image), as designated or defined by panoptic segments. In addition, the dual-guided inpainting system 102 divides the regions of pixels depicting the structures into additional regions (or sub-regions) according to surface plane segments (e.g., to divide the panoptic segments by individual planes to indicate or represent different surface planes within the panoptic segments). Thus, the dual-guided inpainting system 102 generates a plane panoptic segmentation map that depicts edges or boundaries between different objects, structures, and surfaces within the inpainted digital image.

As further illustrated in FIG. 2, the dual-guided inpainting system 102 performs an act 206 to generate a plane grouping map. In particular, the dual-guided inpainting system 102 generates a plane grouping map from a plane panoptic segmentation map. To elaborate, the dual-guided inpainting system 102 generates a plane grouping map by grouping plane panoptic segments together according to their respective surface planes (or normal vectors). In some cases, a plane grouping map refers to a (visual) representation of surface plane groups, where pixels on surface planes of the same semantic class and/or instance that are also facing a common direction are grouped together and visually distinguished from pixels of other surface planes.

To generate a plane grouping map, in certain embodiments, the dual-guided inpainting system 102 determines normal vectors for different plane panoptic segments from the plane panoptic segmentation map (as generated via the act 204). For example, the dual-guided inpainting system 102 determines a normal vector for a plane panoptic segment by determining a vector projected orthogonally from a surface plane detected via the surface detection model. In some embodiments, the dual-guided inpainting system 102 determines or detects lines within the inpainted digital image and clusters the lines according to distinct vanishing points.

For example, the dual-guided inpainting system 102 detects lines within each plane panoptic segment of the plane panoptic segmentation map. The dual-guided inpainting system 102 further clusters the lines based on distinct vanishing points indicating positions where the receding (parallel) lines would seem to meet if projected in linear perspective. Based on the clustering, the dual-guided inpainting system 102 identifies surface planes within the inpainted digital image. For instance, the dual-guided inpainting system 102 determines or assigns normal vectors to detected surface planes defined by clusters of lines.

In some cases, the dual-guided inpainting system 102 further groups surface planes together by comparing the normal vectors and grouping planes with the same or similar (e.g., within a threshold number of degrees or radians) normal vectors into surface plane groups. In one or more embodiments, the dual-guided inpainting system 102 determines surface planes and normal vectors for panoptic segments of the plane panoptic segmentation map based on line clustering according to vanishing points and further based on assigning normal vectors. For instance, the dual-guided inpainting system 102 clusters lines of plane panoptic segments (e.g., to cluster lines with common vanishing points) and determines normals for the plane panoptic segments based on the line clustering to thereby identify plane panoptic segments that belong to a common surface plane group. As shown, the plane grouping map indicates different planes with different shading styles, where a plane along the ground is depicted with cross-hatch shading, a plane for sides of the building facing one direction is depicted with dark vertical lines against a gray background, and a plane for the side of the building facing a different direction is depicted with white dotted shading against a black background.

As further illustrated in FIG. 2, the dual-guided inpainting system 102 performs an act 208 to generate a modified inpainted digital image. To elaborate, the dual-guided inpainting system 102 generates the modified inpainted digital image by filling holes of an initial digital image at an initial (e.g., upsampled) resolution. The dual-guided inpainting system 102 generates the modified inpainted digital image utilizing the plane panoptic segmentation map and the plane grouping map generated from the downsampled inpainted digital image as guides. Indeed, the dual-guided inpainting system 102 utilizes a guided inpainting model to generate the modified inpainted digital image as guided by the plane panoptic segmentation map and the plane grouping map.

In some embodiments, the dual-guided inpainting system 102 generate the modified inpainted digital image utilizing one or more optimization algorithms to inform the sampling of the initial digital image (e.g., for selecting pixels to fill holes). For example, the dual-guided inpainting system 102 utilizes an appearance guidance optimization algorithm to sample the digital image as informed by the plane panoptic segmentation map (e.g., the appearance guide). Specifically, the appearance guidance optimization algorithm encourages the dual-guided inpainting system 102 to sample according to structure separation (e.g., edges or boundaries) between plane panoptic segments within the plane panoptic segmentation map.

In addition, the dual-guided inpainting system 102 utilizes a geometry guidance optimization algorithm to sample the digital image as informed by the plane grouping map (e.g., the geometry guide). More particularly, the geometry guidance optimization algorithm encourages the dual-guided inpainting system 102 to sample patches according to surface planes within digital image. For instance, the geometry guidance objective function encourages (or forces) sample patches (e.g., patches of pixels used for filling holes) to fall on the same surface plane as target patches (e.g., patches of pixels to be filled or replaced or near those to be filled or replaced).

In certain embodiments, the dual-guided inpainting system 102 utilizes a regularity optimization algorithm to sample the digital image (together with the appearance guidance optimization algorithm and/or the geometry guidance optimization algorithm). For example, the regularity optimization algorithm facilitates sampling patches according to regularity modes of a digital image. In some cases, a regularity mode refers to an offset vector that indicates an offset (e.g., a translation, a transform, a rotation, a scaling, a transpose, or some other manipulation in a rectified space) to locate a sample patch from a target patch. A regularity mode refers to a particular offset vector determined from features of patches (or pixels) that satisfy a similarity threshold in relation to each other. The dual-guided inpainting system 102 thus utilizes a regularity optimization algorithm to sample patches in orthogonal directions from regularity modes and/or from a target patch.

Based on one or more of the aforementioned optimization algorithms, the dual-guided inpainting system 102 generates a modified inpainted digital image. Indeed, the dual-guided inpainting system 102 utilizes a guided inpainting model to sample patches from an initial digital image according to the optimization algorithms to identify patches (or pixels) to fill one or more holes. As a result, the dual-guided inpainting system 102 generates a seamless, visually believable inpainted digital image with pixels that align well with surrounding areas, even for regions with high regularity and repeating patterns.

Figure 3:
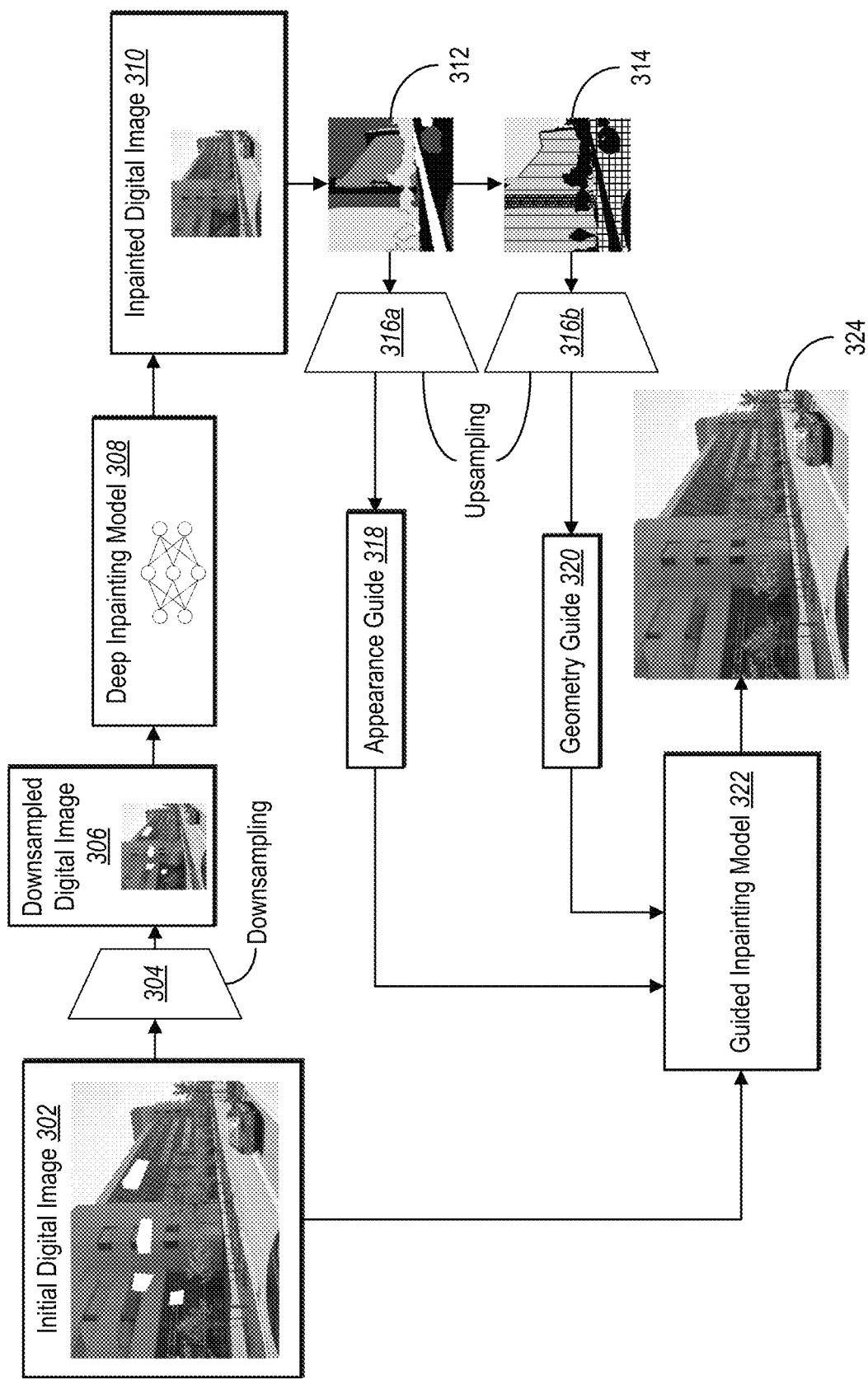
FIG. 3 illustrates additional details regarding generating a modified inpainted digital image utilizing a guided inpainting model in accordance with one or more embodiments.

As mentioned, in certain described embodiments, the dual-guided inpainting system 102 generates a modified inpainted digital image utilizing a plane panoptic segmentation map and a plane grouping map. In particular, the dual-guided inpainting system 102 generates a modified inpainted digital image by sampling pixels of a digital image to fill holes within the digital image according to plane panoptic segments and surface plane groups. FIG. 3 illustrates a flow for generating a modified inpainted digital image from an initial digital image utilizing a plane panoptic segmentation map and a plane grouping map in accordance with one or more embodiments.

As illustrated in FIG. 3, the dual-guided inpainting system 102 identifies or accesses an initial digital image 302. For example, the dual-guided inpainting system 102 accesses the initial digital image 302 from the database 112 based on receiving a user interaction from the client device 108 selecting the initial digital image 302. In some cases, the dual-guided inpainting system 102 receives the initial digital image 302 as an upload from the client device 108 or from another source in response to a user interaction from the client device 108. As shown, the initial digital image 302 depicts an office building along a street, where the building includes several holes of missing pixels (e.g., the white portions of the building).

As further illustrated in FIG. 3, the dual-guided inpainting system 102 performs a downsampling 304. In particular, the dual-guided inpainting system 102 downsamples the initial digital image 302 from an initial resolution to a downsampled resolution to generate the downsampled digital image 306. For instance, the dual-guided inpainting system 102 downsamples the initial digital image 302 from a 4k or 8k resolution (or some other resolution) to a smaller resolution such as 512×512 pixels for the downsampled digital image 306. In some cases, downsampling the initial digital image 302 reduces computational requirements and processing time for generating a modified inpainted digital image (e.g., the modified inpainted digital image 324). Indeed, rather than processing each pixel of a high resolution digital image (e.g., the initial digital image 302), the dual-guided inpainting system 102 saves computational expense by performing the more burdensome processes (e.g., generating a plane panoptic segmentation map and plane grouping map) at a lower resolution of the downsampled digital image 306.

As shown, the dual-guided inpainting system 102 further utilizes a deep inpainting model 308 to generate an inpainted digital image 310. More specifically, the dual-guided inpainting system 102 utilizes a deep inpainting model trained to fill holes within the downsampled digital image 306. In some embodiments, the dual-guided inpainting system 102 utilizes a deep inpainting model 308 as described in ProFill (Y. Zeng, Z. Lin, J. Yang, J. Zhang, E. Shechtman, and H. Lu, *High-Resolution Image Inpainting with Iterative Confidence Feedback and Guided Upsampling*, European Conf. on Computer Vision, 1-17 (2020)) or DeepFillv2 (J. Yu, Z. Lin, J. Yang, X. Shen, X. Lu, and T. S. Huang, *Free-Form Image Inpainting with Gated Convolution*, Proceedings of IEEE Int'l Conf. on Computer Vision, 4471-80 (2019)).

Alternatively, the dual-guided inpainting system 102 utilizes a deep inpainting model 308 in the form of the CoModGAN model described by S. Zhao, J. Cui, Y. Sheng, Y. Dong, X. Liang, E. I. Chang, and Y. Xu in *Large Scale Image Completion via Co-Modulated Generative Adversarial Networks*, arXiv:2103.10428, Int'l Conf. on Learning Representations (2021). In certain cases, the dual-guided inpainting system 102 utilizes a PyTorch implementation of CoModGAN. In other embodiments, the dual-guided inpainting system 102 utilizes a different deep inpainting model 308 such as a transformer-based model such as TFill (C. Zheng, T.-J. Cham, and J. Cai, *TFill: Image Completion via a Transformer-Based Architecture*, arXiv:2104:00845 (2021)) or ICT (Z. Wan, J. Zhang, D. Chen, and J. Liao, *High-Fidelity Pluralistic Image Completion with Transformers*, arXiv:2103:14031 (2021)).

In any event, the dual-guided inpainting system 102 generates the inpainted digital image 310 in the form of a preliminary inpainted digital image at a downsampled resolution. In some cases, the inpainted digital image 310 is not accurately inpainted, where holes are filled with pixels that may not align perfectly or otherwise provide an optimal result. However, the dual-guided inpainting system 102 utilizes the inpainted digital image 310 as an intermediate basis for generating a plane panoptic segmentation map 312 and a plane grouping map 314.

In one or more embodiments, the dual-guided inpainting system 102 need not explicitly generate the inpainted digital image 310 as part of the process. Instead, in some embodiments, the dual-guided inpainting system 102 bypasses the deep inpainting model 308 and generates a plane panoptic segmentation map (e.g., the plane panoptic segmentation map 312) directly from the downsampled digital image 306 or from the initial digital image 302 (e.g., without first utilizing the deep inpainting model 308 to generate the inpainted digital image 310). For instance, the dual-guided inpainting system 102 utilizes a plane panoptic segmentation model to generate a plane panoptic segmentation map (e.g., the plane panoptic segmentation map 312) from the downsampled digital image 306 or the initial digital image 302. Thus, the dual-guided inpainting system 102 estimates plane and panoptic structures everywhere in the downsampled digital image 306 (or the initial digital image 302), including inside the holes depicted inside the image. In such, cases the dual-guided inpainting system 102 effectively merges the process of generating the inpainted digital image 310 and the plane panoptic segmentation map 312.

Indeed, as illustrated in FIG. 3, the dual-guided inpainting system 102 generates a plane panoptic segmentation map 312 from the inpainted digital image 310. More specifically, the dual-guided inpainting system 102 generates a plane panoptic segmentation map 312 that includes plane panoptic segments separating different structures depicted within the inpainted digital image 310 (and therefore the initial digital image 302 as well). For instance, the plane panoptic segmentation map 312 separates structures by semantic class, instance label, and surface plane. In some cases, the plane panoptic segmentation map 312 indicates separate structures with visible color differences and/or visible edges or boundaries. As shown, the plane panoptic segmentation map 312 depicts structures for all of the plane panoptic segments with colored pixels of one color for trees, a second color for roads, a third color for cars, a fourth color for some portions of the building (e.g., on one surface plane), a fifth color for other portions of the building (e.g., on a different surface plane), and so on. Additional detail regarding generating the plane panoptic segmentation map 312 is provided below with reference to subsequent figures.

As further illustrated in FIG. 3, the dual-guided inpainting system 102 generates a plane grouping map 314 from the inpainted digital image 310. In particular, the dual-guided inpainting system 102 generates the plane grouping map 314 from the plane panoptic segmentation map 312. For example, the dual-guided inpainting system 102 groups plane panoptic segments of the plane panoptic segmentation maps 312 into surface plane groups and represents the different surface plane groups with different visual characteristics. Specifically, the dual-guided inpainting system 102 assigns normal vectors to individual plane panoptic segments and groups the segments according to their normal vectors.

As shown, the plane grouping map 314 depicts different surface plane groups with boundaries between them, represented by different colors (or shading or patterns). For instance, the plane grouping map 314 includes a first surface plane group for the portions of the building that are facing the same direction (even if the planes are at different depths), a second surface plane group for the portion of the building facing a different direction, a third surface plane group for the roads, and a fourth surface plane group for the plane panoptic segments not on any particular surface plane (e.g., trees and cars). Additional detail regarding generating the plane grouping map 314 is provided below with reference to subsequent figures.

In one or more embodiments, the dual-guided inpainting system 102 further performs an upsampling 316a to upsample the plane panoptic segmentation map 312 from the downsampled resolution of the inpainted digital image 310 back to the higher resolution of the initial digital image 302. Likewise, the dual-guided inpainting system 102 performs an upsampling 316b to upsample the plane grouping map 314 from the downsampled resolution to the initial resolution. Thus, the dual-guided inpainting system 102 generates an appearance guide 318 in the form of an upsampled plane panoptic segmentation map and generates a geometry guide 320 in the form of an upsampled plane grouping map.

As further illustrated in FIG. 3, the dual-guided inpainting system 102 utilizes a guided inpainting model 322 to generate a modified inpainted digital image 324. To elaborate, the dual-guided inpainting system 102 utilizes a guided inpainting model 322 guided by the appearance guide 318 (or the plane panoptic segmentation map 312) and the geometry guide 320 (or the plane grouping map 314). For example, the dual-guided inpainting system 102 utilizes the guided inpainting model 322 to sample patches or pixels from the initial digital image 302 to fill the holes according to an appearance guidance optimization algorithm, a geometry guidance optimization algorithm, and/or a regularity optimization algorithm. In some cases, the dual-guided inpainting system 102 utilizes a modified version of the inpainting model described by Connelly Barnes, Eli Shechtman, A. Finkelstein, and Dan Goldman in *PatchMatch: A Randomized Correspondence Algorithm for Structural Image Editing*, ACM Trans. Graph. 28(3):24 (2009) which is incorporated herein by reference in its entirety. Specifically, the dual-guided inpainting system 102 utilizes a guided version of PatchMatch as the guided inpainting model 322 to sample patches according to the appearance guide 318 and the geometry guide 320.

In alternative implementations, the dual-guided inpainting system 102 utilizes a guided inpainting model similar to the one described by J. B. Huang, S. B. Kang, N. Ahuja, and J. Kopf in *Image Completion Using Planar Structure Guidance*, ACM Transactions on Graphics, 33(4):1-10 (2014), which is hereby incorporated by reference in its entirety. In such embodiments, the dual-guided inpainting system 102 utilizes the plane panoptic segmentation map 312 for the appearance guide to enhance semantic meaning inside the filed hole(s) to generate improved results. Additionally, the dual-guided inpainting system 102 utilizes the plane grouping map 314 as the planar guidance rather than a heuristic line density map. Together the plane panoptic segmentation map 312 and plane grouping map 314 embed semantic meaning into the regions being filled and apply better transformation for source patches as compared to the system described in *Image Completion Using Planar Structure Guidance*.

In some embodiments, instead of utilizing the guided inpainting model 322, the dual-guided inpainting system 102 utilizes an inpainting neural network to generate the modified inpainted digital image 324. To elaborate, the dual-guided inpainting system 102 trains an inpainting neural network utilizing the appearance guide 318 (or the plane panoptic segmentation map 312) and the geometry guide 320 (or the plane grouping map 314) as training data.

For instance, the dual-guided inpainting system 102 trains and utilizes an inpainting neural network with internal parameters (e.g., weights and biases) tuned to fill holes based on the appearance guide 318 and the geometry guide 320. In certain embodiments, the dual-guided inpainting system 102 utilizes an inpainting neural network such as (or based on) the model described by Yu Zeng, Zhe Lin, Jimei Yang, Jianming Zhang, Eli Shechtman, and Huchuan Lu in *High-resolution Inpainting with Iterative Confidence Feedback and Guided Upsampling*, arXiv:2005.11742 (2020), which is incorporated by reference herein in its entirety. In some cases, the dual-guided inpainting system 102 trains an inpainting neural network to generate digital images by comparing predictions (e.g., digital images generated from initial digital images with holes utilizing the appearance guide 318 and the geometry guide 320) with ground truth inpainted digital images. As shown, modified inpainted digital image 324 depicts the same scene as the initial digital image 302 but with pixels filling the holes in a believable, realistic, accurate manner.

Figure 4:
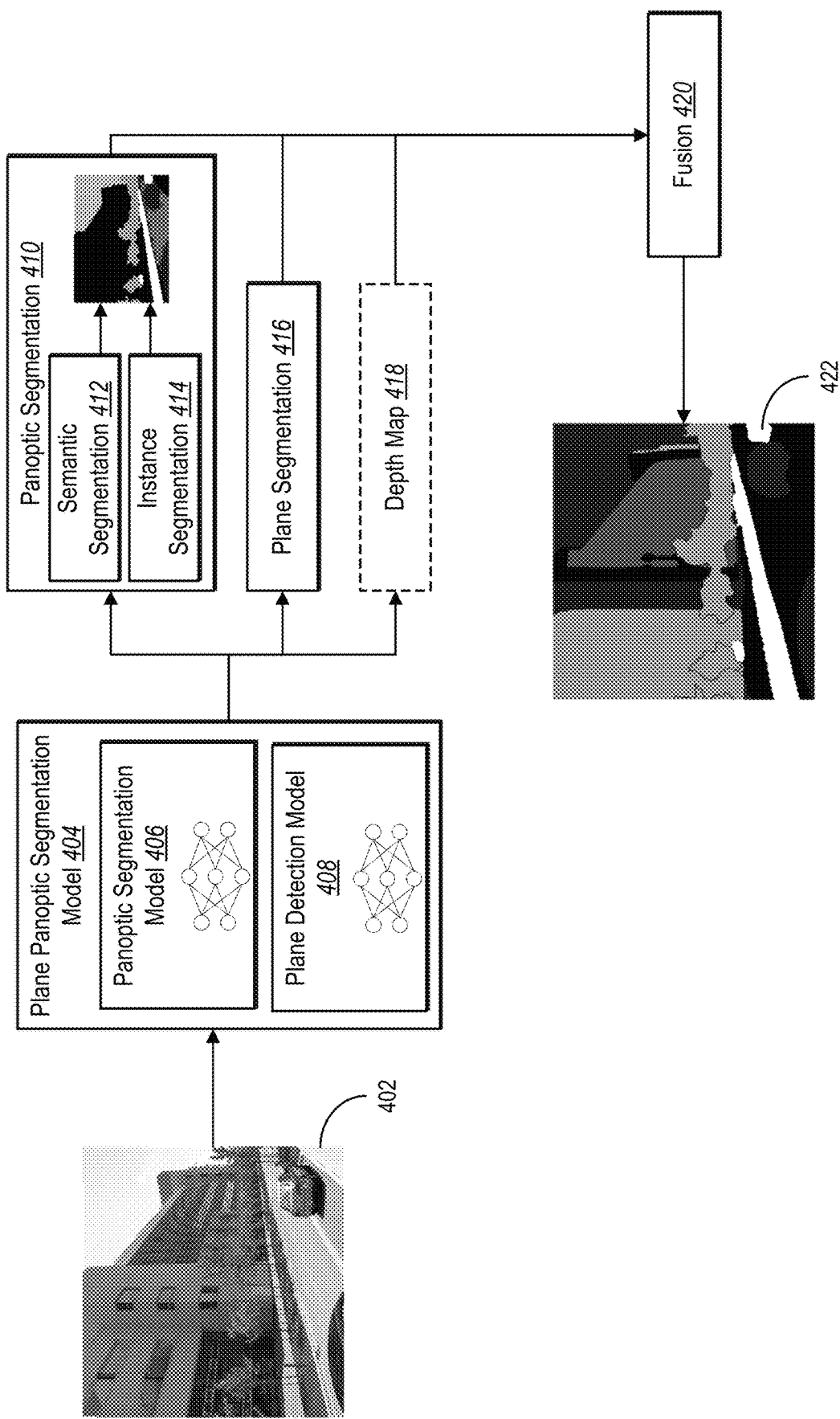
FIG. 4 illustrates an example flow for generating a plane panoptic segmentation map in accordance with one or more embodiments.

As mentioned above, in certain embodiments, the dual-guided inpainting system 102 generates a plane panoptic segmentation map (e.g., the plane panoptic segmentation map 312). In particular, the dual-guided inpainting system 102 generates a plane panoptic segmentation map the depicts plane panoptic segments separating different structures within a digital image. FIG. 4 illustrates an example flow for generating a plane panoptic segmentation map in accordance with one or more embodiments.

As illustrated in FIG. 4, the dual-guided inpainting system 102 accesses or receives a digital image 402. For example, the digital image 402 is an inpainted digital image in a downsampled resolution (e.g., the inpainted digital image 310) or an initial resolution. In addition, the dual-guided inpainting system 102 utilizes a plane panoptic segmentation model 404 to generate a plane panoptic segmentation map 422. More specifically, the dual-guided inpainting system 102 utilizes a plane panoptic segmentation model 404 that includes one or more constituent components such as a panoptic segmentation model 406 and a plane detection model 408. Indeed, in some cases, the plane panoptic segmentation model 404 is a machine learning model such as a neural network that includes neural networks such as a panoptic segmentation neural network and a plane detection neural network.

As shown, the dual-guided inpainting system 102 utilizes a panoptic segmentation model 406 (e.g., as part of the plane panoptic segmentation model 404) to generate or determine a panoptic segmentation 410. To elaborate, the dual-guided inpainting system 102 determines a panoptic segmentation that includes panoptic segments separating regions of pixels according to semantic segmentation 412 and instance segmentation 414. Indeed, the panoptic segmentation model 406 determines semantic segmentations for each pixel of the digital image 402 to indicate object types depicted by the individual pixels. In addition, the panoptic segmentation model 406 determines instance labels or instance identifications for each pixel of the digital image 402 to indicate the specific instance of semantic class depicted by the pixels (e.g., to differentiate between multiple instances of the same semantic class depicted within an image).

In one or more embodiments, the dual-guided inpainting system 102 utilizes a panoptic segmentation model 406 in the form of a panoptic segmentation neural network trained to generate panoptic segments from a digital image (e.g., the digital image 402). For example, the panoptic segmentation model 406 is a panoptic segmentation neural network as described in U.S. patent Ser. No. 17/319,979, filed on May 13, 2021, entitled, "Generating Improved Panoptic Segmented Digital Images Based On Panoptic Segmentation Neural Networks That Utilize Exemplar Unknown Object Classes," the entire contents of which are hereby incorporated by reference. Alternatively, the panoptic segmentation model 406 is a model based on PanopticFCN as described by Y. Li, H. Zhao, X. Qi, L. Wang, Z. Li, J. Sun, and J. Jia in *Fully Convolutional Networks for Panoptic Segmentation*, Proceedings of IEEE Conf. on Computer Vision and Pattern Recognition, 214-23 (2021). In certain cases, the panoptic segmentation model 406 is a modified PanopticFCN model with a ResNet101 backbone. In other cases, the panoptic segmentation model is based on MaskFormer, as described by B. Cheng, G. Schwing, and A. Kirillov in *Per Pixel Classification is Not All You Need for Semantic Segmentation*, arXiv:2107.06278 (2021), or SegFormer, as described by E. Xie, W. Wang, Z. Yu, A. Anandkumar, J. M. Alvarez, and P. Luo in SegFormer: *Simple and Efficient Design for Semantic Segmentation with Transformers*, arXiv: 2105.15203 (2021). In one or more embodiments, the dual-guided inpainting system 102 utilizes a panoptic segmentation model trained on a particular dataset, such as the COCO Panoptic Dataset, the ADE20K dataset, and/or the CityScapes dataset.

As further shown, the dual-guided inpainting system 102 also utilizes a plane detection model 408 (e.g., as part of the plane panoptic segmentation model 404) to generate or determine a plane segmentation 416. Indeed, the dual-guided inpainting system 102 utilizes the plane detection model 408 to determine or identify surface planes depicted within the digital image 402. For example, the dual-guided inpainting system 102 treats plane detection as an instance segmentation problem to determine plane categories. The dual-guided inpainting system 102 further segments instances of a single plane category into separate segments. In some embodiments, the plane segmentation 416 indicates different surface planes within the digital image 402.

In some cases, the dual-guided inpainting system 102 utilizes a plane detection model 408 in the form of a plane detection neural network trained to detect surface planes. For example, the dual-guided inpainting system 102 utilizes a plane detection model 408 derived from Mask-RCNN (K. He, G. Gkioxari, P. Dollar, and R. Girshick in *Mask R-CNN*, Proceedings of IEEE Int'l Conf. on Computer Vision, 2961-69 (2017)) implemented in Detectron2 (e.g., in PyTorch), as described by Y. Wu, A. Kirillov, F. Massa, W.-Y. Lo, and R. Girshick in Detectron2, https://github.com/facebookresearch/detectron2 (2019), the contents of each of which are hereby incorporated by reference in their entirety.

In some cases, the dual-guided inpainting system 102 utilizes a plane detection model 408 such as PlaneRCNN described by C. Liu, K. Kim, J. Gu, Y. Furukawa, and J. Kautz in *PlaneRCNN: 3D Plane Detection and Reconstruction from a Single Image*, Proceedings of IEEE Conf. on Computer Vision and Pattern Recognition, 4450-59 (2019), the entire contents of which are hereby incorporated by reference. For instance, the dual-guided inpainting system 102 utilizes Mask R-CNN to determine surface plane labels and further determines instances of the surface plane labels. In some cases, the dual-guided inpainting system 102 trains and utilizes the plane detection model 408 based on one or more datasets, such as the HoliCity dataset, the ScanNet dataset, the OpenRooms dataset, and the Adobe Internal dataset for Mada Project. In certain embodiments, the dual-guided inpainting system 102 initially trains the plane detection model 408 for semantic segmentation on the COCO dataset (e.g., to have a common output format as the panoptic segmentation model 406) and further fine tunes the network parameters on HoliCity, ScanNet and/or other datasets mentioned above. Thus, the dual-guided inpainting system 102 utilizes a plane detection model 408 trained to generate a plane segmentation 416 indicating different surface planes depicted within the digital image 402.

As further illustrated in FIG. 4, in some embodiments, the dual-guided inpainting system 102 determines or generates a depth map 418. More specifically, the dual-guided inpainting system 102 determines depths of individual pixels within the digital image 402. In some cases, the dual-guided inpainting system 102 groups pixels into segments based on comparing depths of the pixels to, for example, group pixels within different depth ranges. From depth information, in some embodiments, the dual-guided inpainting system 102 determines orientations of surface planes depicted within the digital image 402. For instance, the dual-guided inpainting system 102 determines and compares surface plane orientations to identify and group surface planes together that are within a certain orientation range (or a threshold number of degrees or radians of each other). Indeed, in some cases, surface planes that have similar orientations are more likely to share similar textures or appearances, so grouping surface planes together based on orientation can facilitate more intelligent patch sampling.

To generate the depth map 418, in one or more embodiments, the dual-guided inpainting system 102 utilizes a depth prediction model. For example, the dual-guided inpainting system 102 utilizes a depth prediction model trained to predict pixel depths and/or to segment a digital image into depth segments based on pixel depths. In some cases, the dual-guided inpainting system 102 utilizes a depth prediction model in the form of a depth prediction neural network, such as a monocular depth prediction neural network such as the model described in U.S. patent application Ser. No. 17/186,436, Generating Depth Images Utilizing A Machine-Learning Model Built From Mixed Digital Image Sources And Multiple Loss Function Sets, filed Feb. 26, 2021, which is incorporated herein by reference in its entirety. Alternatively, the depth prediction neural network is a pre-trained monocular depth estimation neural network, such as the monocular depth estimation network described in *Towards Robust Monocular Depth Estimation: Mixing Datasets for Zero-shot Cross-dataset Transfer*, by R. Ranftl et al., published in IEEE Transactions On Pattern Analysis And Machine Intelligence (2019) at arXiv:1907.01341, (hereafter "MiDaS") which is incorporated herein by reference in its entirety. In other implementations, the depth prediction neural network is another type of pre-trained depth prediction model that generates monocular depth predictions.

In one or more embodiments, the dual-guided inpainting system 102 determines additional segmentations based on other information such as object pose estimation utilizing an object pose estimation model. The dual-guided inpainting system 102 is able to further combine object pose estimation with one or more other segmentations to generate the plane panoptic segmentation map 422. In some implementations, the dual-guided inpainting system 102 generates a three-dimensional structural analysis of a digital image utilizing one or more of the aforementioned segmentations.

As illustrated in FIG. 4, the dual-guided inpainting system 102 further performs a fusion 420. To elaborate, the dual-guided inpainting system 102 combines or fuses two or more of the aforementioned segmentations, such as the panoptic segmentation 410 (including the semantic segmentation 412 and the instance segmentation 414), the plane segmentation 416, and/or the depth map 418. Indeed, to generate the plane panoptic segmentation map 422, the dual-guided inpainting system 102 utilizes a combination of two or more of the parsing techniques described above. In some embodiments, the dual-guided inpainting system 102 generates the plane panoptic segmentation map 422 by generating a triplet label for each pixel of the digital image 402.

For example, the dual-guided inpainting system 102 generates a triplet label that includes an indication of a semantic class (of a pixel or segment), an indication of an instance label or an instance identification (of a pixel or segment), and an indication of a surface plane identification (of a pixel or segment). In some embodiments, the dual-guided inpainting system 102 generates a triplet label in the following form:

$$(l_i, z_i, p_i)$$

where $$l_i \in \{0, 1, 2, \ldots, L\}$$

for L predefined semantic classes, $$z_i \in \{0, 1, \ldots, N_{l_i}\}$$

represents an instance label or instance identifications for a specific semantic class $l_i$, and $$p_i \in \{0, 1, \ldots, P\}$$

represents a surface plane identification among P total detected surface planes for a digital image I. When $p_i = 0$, the dual-guided inpainting system 102 does not detect a surface plane for the given pixel. In cases where the dual-guided inpainting system 102 determines the same triplet label $(l_i,$ $z_i$, $p_i$) for two or more pixels, the dual-guided inpainting system 102 groups the pixels in the same structure or the same plane panoptic segment.

In one or more embodiments, the dual-guided inpainting system 102 generates a triplet label that includes a depth indication (e.g., from the depth map 418). For example, the dual-guided inpainting system 102 replaces, for a given pixel, one of the semantic class, the instance identification, or the surface plane identification with a depth indication. Thus, the dual-guided inpainting system 102 generates a plane panoptic segmentation map that indicates pixel depth. In other embodiments, the dual-guided inpainting system 102 generates a quadruplet label that includes semantic class, the instance identification, the surface plane identification, and the depth indication to thereby generate a plane panoptic segmentation map that includes all four segmentations.

In certain embodiments, the dual-guided inpainting system 102 performs the fusion 420 utilizing heuristic merging logic. More specifically, the dual-guided inpainting system 102 fuses the panoptic segmentation 410 with the plane segmentation 416 (and/or the depth map 418) to generate the plane panoptic segmentation map 422. For example, the dual-guided inpainting system 102 determines a distance transform of each:

$$1 - \mathbb{1}(p_i=1).$$

In addition, the dual-guided inpainting system 102 loops over the object instances (e.g., the different instances of each semantic class) of the panoptic segmentation 410 to classify the instances into multi-plane structures (e.g., buildings), single-plane structures (e.g., ceiling), and non-plane structures (e.g., people).

In some cases, the dual-guided inpainting system analyzes the different semantic object instances within the panoptic segmentation categories to classify the semantic instances as multi-plane structures, single-plane structures, or non-plane structures. For single-plane structures, the dual-guided inpainting system can assign a single surface plane identification (e.g., from the plane segmentation 416). For non-plane structures, the dual-guided inpainting system assigns a particular surface plane identification (e.g., for a frontal-parallel surface plane). For multi-plane structures, the dual-guided inpainting system 102 utilizes the results from the plane segmentation 416 to further split or divide the regions or segments of the different instances.

In some cases, the dual-guided inpainting system 102 further removes plane panoptic segments (or surface plane predictions) occupying less than a threshold portion of an instance (e.g., less than 10% of the instance area) or occupying less than a threshold number of pixels. For each pixel of an instance mask, the dual-guided inpainting system 102 determines plane separation by determining a surface plane identification with a minimum distance value in a distance transform map. The dual-guided inpainting system 102 thus squeezes boundaries better for the plane panoptic segments. As shown, the plane panoptic segmentation map 422 depicts different plane panoptic segments indicating structure separation between surface planes, semantic classes, instance labels, and/or segment (or plane or pixel) depths.

In some embodiments, the dual-guided inpainting system 102 performs a step for generating a plane panoptic segmentation map indicating panoptic segments and surface plane segments within the inpainted digital image. The above description of act 204 provided in relation to FIG. 2, including the more detailed description in support of act 204 provided in relation to FIGS. 3-4, provide various embodiments and supporting acts and algorithms for performing a step for generating a plane panoptic segmentation map indicating panoptic segments and surface plane segments within the inpainted digital image.

For example, in some embodiments, performing a step for generating a plane panoptic segmentation map indicating panoptic segments and surface plane segments within the inpainted digital image includes generating a panoptic segmentation (e.g., the panoptic segmentation 410) utilizing a panoptic segmentation model (e.g., the panoptic segmentation model 406), generating a plane segmentation (e.g., the plane segmentation 416) utilizing a plane detection model 408, and/or generating a depth map (e.g., the depth map 418) utilizing a depth prediction model, as described in relation to FIG. 4. In some embodiments, performing a step for generating a plane panoptic segmentation map indicating panoptic segments and surface plane segments within the inpainted digital image also includes merging, combining, or fusing a panoptic segmentation, a plane segmentation, and/or a depth map into a plane panoptic segmentation, as described in relation to FIG. 4.

Figure 5:
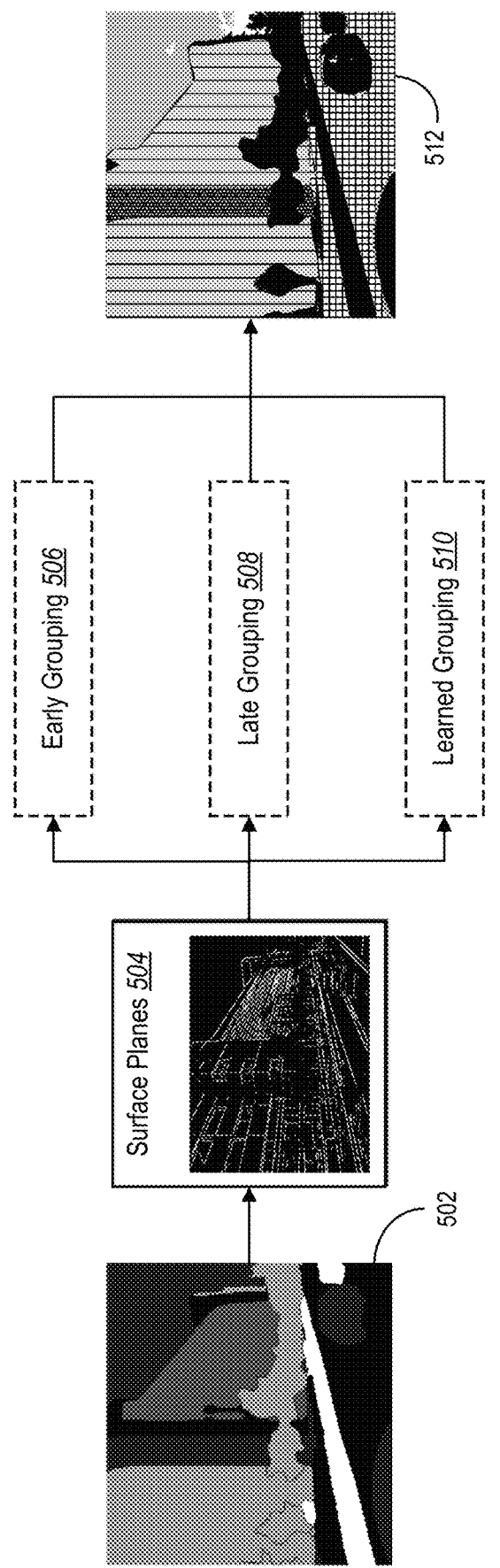
FIG. 5 illustrates an example flow for generating a plane grouping map in accordance with one or more embodiments.

As mentioned above, in certain described embodiments, the dual-guided inpainting system 102 generates a plane grouping map (e.g., the plane grouping map 314). In particular, the dual-guided inpainting system 102 generates a plane grouping map from a plane panoptic segmentation map (e.g., the plane panoptic segmentation map 312 or 422). FIG. 5 illustrates an example process flow for generating a plane grouping map in accordance with one or more embodiments.

As illustrated in FIG. 5, the dual-guided inpainting system 102 accesses a plane panoptic segmentation map 502 (e.g., the plane panoptic segmentation map 312 or 422). In addition, the dual-guided inpainting system 102 groups the plane panoptic segments from the plane panoptic segmentation map 502 into a plane grouping map 512. Specifically, for each segment of the plane panoptic segmentation map 502, the dual-guided inpainting system 102 determines a normal vector and groups the plane panoptic segments into surface plane groups according to the normal vectors. For example, the dual-guided inpainting system 102 groups segments within particular ranges of degrees or radians for normal vectors. As another example, the dual-guided inpainting system 102 groups segments that have normal vectors within a threshold number of degrees or radians together.

In some embodiments, the dual-guided inpainting system 102 groups plane panoptic segments into (or independently determines from a digital image) surface planes 504 based on detecting and clustering lines according to distinct vanishing points within a digital image. For instance, the dual-guided inpainting system 102 detects lines within a digital image or within the plane panoptic segmentation map 502 by utilizing line segment extraction. The dual-guided inpainting system 102 further separates the detected lines into clusters by implementing vanishing point estimation and grouping the line segments that have a common detected vanishing point (or vanishing points within a threshold distance or difference from one another) into common line clusters. In certain embodiments, the dual-guided inpainting system 102 thus generates the surface planes 504 defined by the different line clusters whose lines share (similar) vanishing points.

In one or more embodiments, the dual-guided inpainting system 102 detects line segments and clusters the line segments according to vanishing points using the techniques and methods described in *Image Completion Using Planar Structure Guidance*. For instance, the dual-guided inpainting system 102 determines vanishing points of a digital image using line segment detection (LSD) and J-linkage. The dual-guided inpainting system 102 then utilizes the vanishing points to determine vanishing lines and a rectification matrix defining the surface planes 504 based on vanishing lines. The dual-guided inpainting system 102 further uses the detected lines to determine a geometry guidance optimization algorithm to encourage sampling source patches along some specific directions. In some implementations, the dual-guided inpainting system 102 utilizes a different technique to determine vanishing points, such as NeurVPS as described by Y. Zhou, H. Qi, J. Huang, and Y. Ma in *NeurVPS: Neural Vanishing Point Scanning via Conic Convolution*, arXiv:1910.06316 (2019), which is incorporated by reference herein in its entirety.

As shown in FIG. 5, in one or more embodiments, the dual-guided inpainting system 102 utilizes different techniques to group surface planes into surface plane groups. For example, in some cases, the dual-guided inpainting system 102 utilizes early grouping 506 to generate the plane grouping map 512. In other cases, the dual-guided inpainting system 102 utilizes late grouping 508 and/or learned grouping 510 to generate the plane grouping map 512.

For early grouping 506, the dual-guided inpainting system 102 first detects lines and clusters the lines according to the vanishing points across the entire digital image (or the entire plane panoptic segmentation map 502). The dual-guided inpainting system 102 further determines a top number (e.g., the top two) vanishing points within each plane segment to determine a surface plane assignment or surface plane identification. In some cases, the dual-guided inpainting system 102 determines or generates a maximum number of surface plane groups for a digital image (or from the plane panoptic segmentation map 502). For instance, in some cases, the dual-guided inpainting system 102 generates three surface plane groups by determining three distinct vanishing points and clustering the detected lines into three groups corresponding to the vanishing points. The dual-guided inpainting system 102 assigns non-planar objects (e.g., people or trees) and plane segments containing no detected line to a frontal-parallel plane. For instance, while assigning u to plane $\hat{p}_j$, the dual-guided inpainting system 102 sets:

$$Pr(\hat{p}_k|u)=1$$

and $$Pr(\hat{p}_k|u)=0$$

for all j≠k, where $Pr(\hat{p}_j|u)$ represents the probability of pixel u belonging to surface plane $\hat{p}_j$ and $Pr(\hat{p}_k|u)$ represents the probability of pixel u belonging to the surface plane $\hat{p}_k$.

For late grouping 508, the dual-guided inpainting system 102 detects lines within each plane segment of a digital image (or of the plane panoptic segmentation map 502). The dual-guided inpainting system 102 further generates a rectification matrix separately and forms a plane probability matrix to determine which surface planes (or plane panoptic segments) belong in common surface plane groups. Unlike early grouping 506, late grouping 508 does not have a limitation of maximum plane numbers and/or plane group numbers.

For learned grouping 510, the dual-guided inpainting system 102 directly estimates or determines normal vectors for surface planes (or plane panoptic segments). The dual-guided inpainting system 102 further groups segments based on the normal vectors. For example, the dual-guided inpainting system 102 groups segments by determining an average normal vector for a digital image (or for the plane panoptic segmentation map 502). In addition, the dual-guided inpainting system 102 groups the planes/segments according to the average normal vector by grouping planes/segments according to how much their respective normal vectors differ from the average normal vector. For instance, the dual-guided inpainting system 102 generates a first surface plane group for normal vectors within a first threshold of degrees or radians relative to the normal vector and generates a second surface plane group for normal vectors within a second threshold of degrees or radians relative to the average normal vector. As another example, the dual-guided inpainting system 102 determines normal vectors for surface planes (or plane panoptic segments) and groups planes/segments that have normal vectors within a threshold number of degrees or radians together.

Using one or more of the early grouping 506, the late grouping 508, or the learned grouping 510, the dual-guided inpainting system 102 generates surface plane groups for the plane grouping map 512. As shown, the plane grouping map 512 depicts a first surface plane group for plane panoptic segments (or surface planes) of the building that are facing or oriented in one direction, a second surface plane group for plane panoptic segments (or surface planes) of the building that are facing another direction, a third surface plane group for plane panoptic segments (or surface planes) of the road, and a fourth surface plane group for the trees and cars in the frontal-parallel plane.

Figure 6:
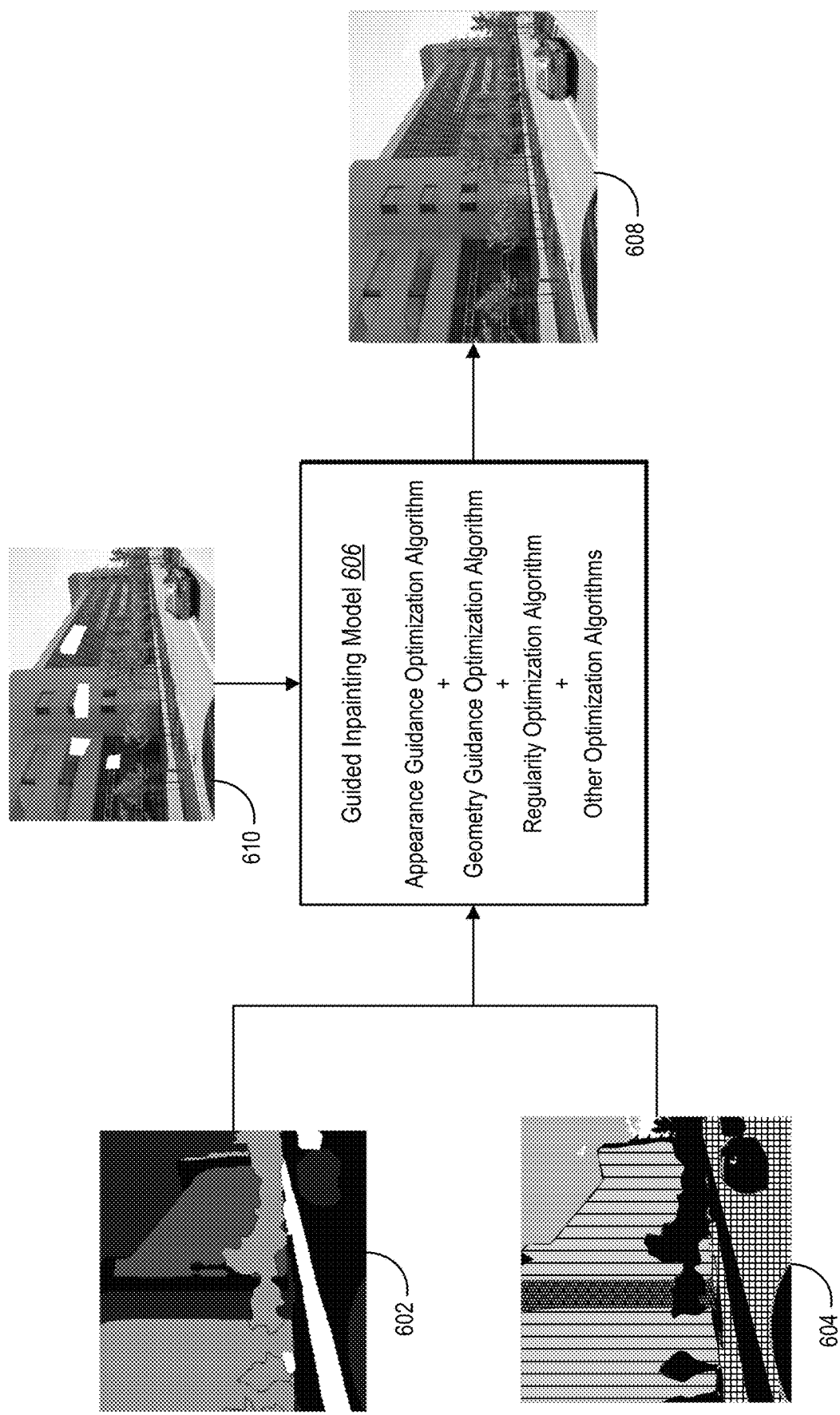
FIG. 6 illustrates an example flow for generating a modified inpainted digital image utilizing a guided inpainting model in accordance with one or more embodiments.

As mentioned, in certain embodiments, the dual-guided inpainting system 102 generates a final modified inpainted digital image from an initial digital image utilizing a plane panoptic segmentation map (e.g., the plane panoptic segmentation map 422) and a plane grouping map (e.g., the plane grouping map 512). In particular, the dual-guided inpainting system 102 generates a modified inpainted digital image at an original (upsampled) resolution of an initial digital image by filling holes in the initial digital image utilizing a guided inpainting model. FIG. 6 illustrates an example flow for generating a modified inpainted digital image utilizing a guided inpainting model in accordance with one or more embodiments.

As illustrated in FIG. 6, the dual-guided inpainting system 102 accesses or generates a plane panoptic segmentation map 602 (e.g., the plane panoptic segmentation map 422) and a plane grouping map 604 (e.g., the plane grouping map 512). Indeed, as described herein, the dual-guided inpainting system 102 generates the plane grouping map 604 from (or, in some cases, independently of) the plane panoptic segmentation map 602. In addition, the dual-guided inpainting system 102 utilizes the plane panoptic segmentation map 602 and the plane grouping map 604 to generate a modified inpainted digital image 608 from a digital image 610 (e.g., by filling holes in the digital image 610). In some cases, the plane panoptic segmentation map 602 and the plane grouping map 604 are upsampled maps at the resolution of an initial digital image, such as the digital image 610.

More specifically, as illustrated in FIG. 6, the dual-guided inpainting system 102 utilizes a guided inpainting model 606 to generate the modified inpainted digital image. For example, the dual-guided inpainting system 102 utilizes a model similar to that described in *Image Completion Using Planar Structure Guidance* (e.g., a modified PatchMatch model), but with specific improvements and modifications. As discussed above, the dual-guided inpainting system 102 utilizes a guided inpainting model 606 that is guided or informed by a plane panoptic segmentation map 602 and a learning-based plane grouping map 604, which provide semantic meaning and result in better transformation of source patches. To accommodate the plane panoptic segmentation map 602 and the plane grouping map 604, the dual-guided inpainting system 102 implements the guided inpainting model 606 according to one or more optimization algorithms that inform, guide, or instruct the guided inpainting model 606 how to sample patches of pixels from the digital image 610 for filling holes.

For example, the dual-guided inpainting system 102 utilizes an appearance guidance optimization algorithm to guide sampling of the digital image 610 according to the plane panoptic segmentation map 602. In some cases, the appearance guidance optimization algorithm constrains the sampling to regions based on the structure separation indicated in the plane panoptic segmentation map 602. For instance, the dual-guided inpainting system 102 utilizes an appearance guidance optimization algorithm (sometimes referred to as an appearance guidance loss) for a 7×7 target patch centered at t on surface plane j when sampling from s, as given by:

$$\mathcal{L}_{AG}(s,t,j)=\|P_A(t)-Q_A(s,t,j)\|_1$$

where t is the center location (or pixel) of the target patch, s is the center location (or pixel) of the sample patch, $P_A(t)$ represents the target patch centered at t and extracted from $I_A$ (i.e., the plane panoptic segmentation map 602), and $Q_A$ represents the source patch centered at s after applying a transformation (an offset) according to the relative position of s and t on surface plane j. By utilizing the appearance guidance optimization algorithm, in some embodiments, the dual-guided inpainting system 102 samples patches to fill holes in the digital image 610 by selecting source patches or pixels from plane panoptic segments that are similar to (or matching) those of target patches.

In one or more embodiments, the dual-guided inpainting system 102 also utilizes a geometry guidance optimization algorithm. In particular, the dual-guided inpainting system 102 utilizes a geometry guidance optimization algorithm (sometimes referred to as a geometry guidance loss) to sample patches from the digital image 610 according to the plane grouping map 604. In some cases, the geometry guidance optimization algorithm encourages (or forces) sampling source patches from the same surface plane as target patches. For instance, the dual-guided inpainting system 102 utilizes a geometry guidance optimization algorithm, as given by:

$$\mathcal{L}_{GG}(t,s,j)=-\log(Pr(j|s)+\epsilon)-\log(Pr(j|t)+\epsilon)$$

where Pr(j|s) represents the probability of location (or pixel) s belonging to surface plane j, Pr(j|t) represents the probability of location (or pixel) t belonging to surface plane j, and $\epsilon$ represents a value to help avoid extreme loss values in cases where there may be zero values in the plane grouping map 604.

In some embodiments, the dual-guided inpainting system 102 also (or alternatively) utilizes a regularity optimization algorithm (sometimes referred to as a regularity loss). In particular, the dual-guided inpainting system 102 utilizes a regularity optimization algorithm to sample patches from the digital image 610 according to regularity modes for a more general sampling (as compared to the model in *Image Completion Using Planar Structure Guidance*). For instance, rather than only sampling in orthogonal directions (e.g., via an orthogonal loss function) of a target patch, the dual-guided inpainting system 102 utilizes the regularity optimization algorithm to accommodate sampling in orthogonal directions of regularity modes in addition to orthogonal directions of the target patch. In cases of inpainting larger holes, conventional direction loss of prior systems can limit regularity sampling because a conventional direction loss will not encourage sampling source patches from regularity modes that do not fall in one of the two orthogonal directions of the target patch.

By adding a direction loss to multiple (e.g., every possible) regularity modes, the dual-guided inpainting system 102 is able to sample patches located on either one of the orthogonal directions of the regularity modes or that of the target patch. In some cases, the dual-guided inpainting system 102 samples for regularities utilizing a regularity optimization algorithm as given by:

$$\mathcal{L}_{Reg}(t,s,r,j)=\min(\mathcal{L}_{td}(t,s,j),\mathcal{L}_{rd}(t,s,r,j),c)$$

where $\mathcal{L}_{td}$ represents a direction loss (or a direction optimization algorithm) on a target position (or a target patch), $\mathcal{L}_{rd}$ represents a direction loss (or a direction optimization algorithm) on a regularity mode adding to the target position, and c is a cap value to allow sampling from other areas if there is no valid source patch along any direction (e.g., c=0.02). In one or more embodiments, the $\mathcal{L}_{td}$ and $\mathcal{L}_{rd}$ are given by the following equations:

$$\mathcal{L}_{td}(t, s, j) = \min(|H_j^1(t)_y - H_j^1(s)_y|, |H_j^2(t)_y - H_j^2(s)_y|)$$

$$\mathcal{L}_{rd}(t, s, r, j) = \min_r(\min(|H_j^1(t+r)_y - H_j^1(s)_y|, |H_j^2(t+r)_y - H_j^2(s)_y|))$$

where $H_j^1$ and $H_j^2$ are the homography transformation functions to transform the lines associated with the two vanishing points of surface plane j to be parallel with the horizontal axis.

In certain embodiments, the dual-guided inpainting system 102 utilizes one or more other optimization algorithms (or other loss functions). For example, the dual-guided inpainting system 102 utilizes an appearance optimization algorithm to sample based on color loss (e.g., RGB color loss) adjusted for gain and bias, denoted by $\mathcal{L}_{color}$. In addition, the dual-guided inpainting system 102 utilizes a proximity optimization algorithm to discourage copying patches from extremely different scales and resolutions, denoted by $\mathcal{L}_{proximity}$. In certain cases, the dual-guided inpainting system 102 combines one or more of the aforementioned optimization algorithms (or loss functions) into an overall optimization algorithm. For example, the dual-guided inpainting system 102 utilizes an overall optimization algorithm to fill holes of the digital image 610 and thereby generate the modified inpainted digital image 608 according to the plane panoptic segmentation map 602, the plane grouping map 604, and/or other sampling techniques. In some embodiments, the overall optimization algorithm for a pair of t and s on plane j is given by the following equation:

$$\mathcal{L}_{all}(t,s,r,j)=\lambda_{color}\mathcal{L}_{color}+\lambda_{AG}\mathcal{L}_{AG}+\lambda_{GG}\mathcal{L}_{GG}+\lambda_{Reg}\mathcal{L}_{Reg}+\lambda_p\mathcal{L}_{proximity}$$

where the different $\lambda$s represent weights for balancing or emphasizing the different optimization algorithms.

Utilizing the regularity optimization algorithm, the dual-guided inpainting system 102 improves the sampling of the model in *Image Completion Using Planar Structure Guidance* by further utilizing a patch similarity threshold. To elaborate, the dual-guided inpainting system 102 extracts features from patches (or pixels) in the original image space and further utilizes a kd-tree to identify or determine a top number of similar features for each feature point (e.g., the top three nearest neighbors). Instead of using all the pairs of similar features to determine offset vectors in rectified space (as described by *Image Completion Using Planar Structure Guidance*), the dual-guided inpainting system 102 selects feature pairs with higher similarity by identifying those that satisfy a patch similarity threshold. For instance, the dual-guided inpainting system 102 selects a sample patch for a target patch by comparing extracted features and determining that the features of the sample patch satisfy a patch similarity threshold in relation to the target patch. Additionally, the dual-guided inpainting system 102 determines cluster centers of selected offset vectors using mean-shift and further utilizing those offset vectors as regularity modes for sampling.

As mentioned above, in one or more embodiments, utilizes a modified PatchMatch model as the guided inpainting model 606. In some cases, for every iteration of the PatchMatch sampling process, the dual-guided inpainting system 102 randomly draws surface plane identifications for each target position according to the plane probability (e.g., to generate the plane panoptic segmentation map 602 and/or plane grouping map 604). Because the plane probability of the dual-guided inpainting system 102 is more confident than prior systems (e.g., *Image Completion Using Planar Structure Guidance*), the drawn surface plane identification map (and the plane grouping map 604) is therefore more continuous and smoother than those generated by prior systems.

In some cases, the dual-guided inpainting system 102 further softens the boundaries of the surface plane identification map or the plane grouping map 604 (e.g., the boundaries between two planes). This soft plane intersection improves determination of plane assignments within boundaries, avoiding some errors that would otherwise results from domain or resolution differences. Specifically, the dual-guided inpainting system 102 determines a distance transform of the mask with all $\hat{p}_j=1$ as $D_j$. The dual-guided inpainting system 102 further applies transformation functions $g(D_j)$ to adjust intensity near boundaries between surface planes. Additionally, the dual-guided inpainting system 102 combines the probability map with the original map and normalizes to generate the plane grouping map 604.

In one or more embodiments, the dual-guided inpainting system 102 implements additional or alternative sampling procedures. For example, the dual-guided inpainting system 102 follows the PatchMatch process to propagate and random search. Additionally, the dual-guided inpainting system 102 applies a transformation matrix to sampled source patches according to drawn plane identification (e.g., in the plane panoptic segmentation map 602 and/or the plane grouping map 604) of the target patch and the relative position of the target patch and the source patch.

Figure 7A:
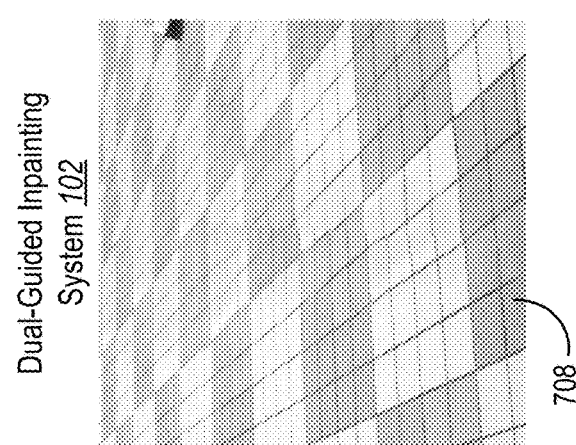
FIGS. 7A-7B illustrate comparisons of inpainted digital images generated by different conventional systems and the dual-guided inpainting system in accordance with one or more embodiments.
Figure 7A:
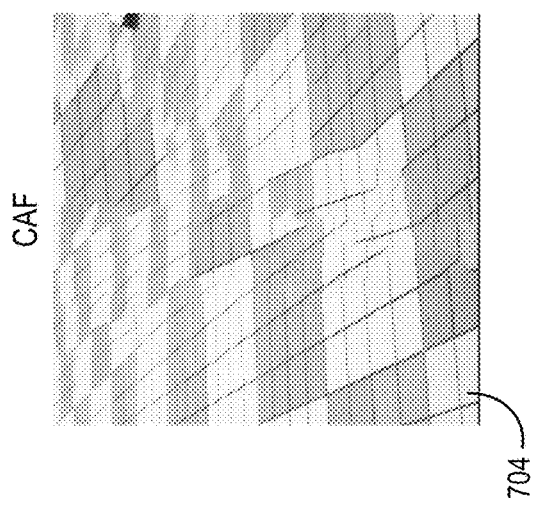
Figure 7A:
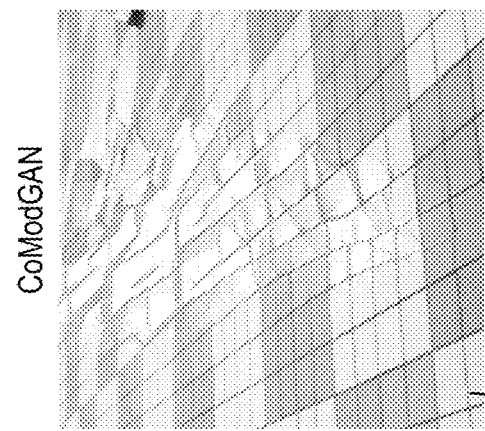
Figure 7A:
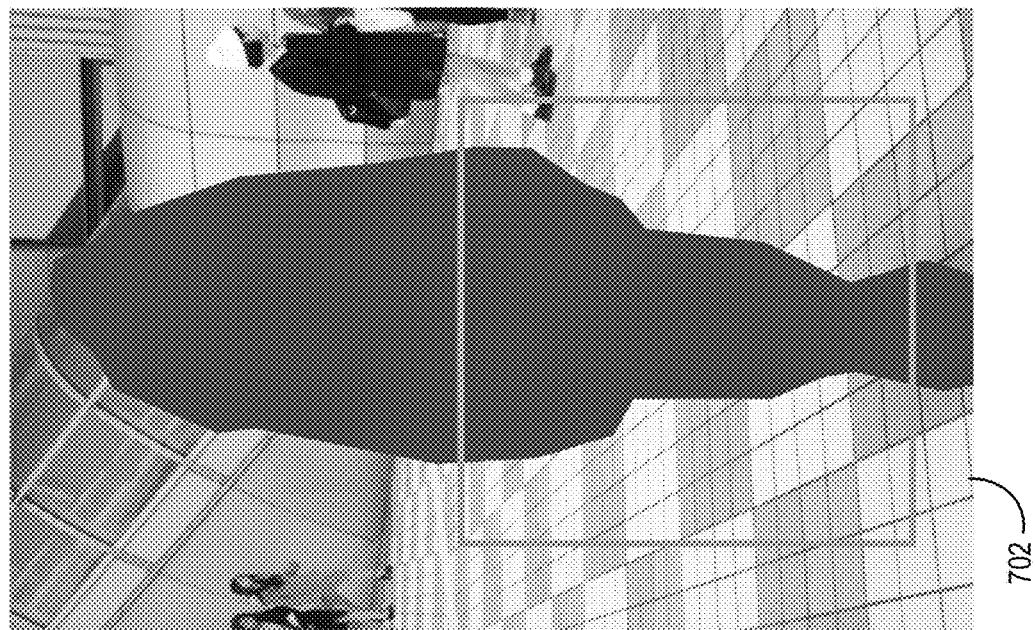
Figure 7B:
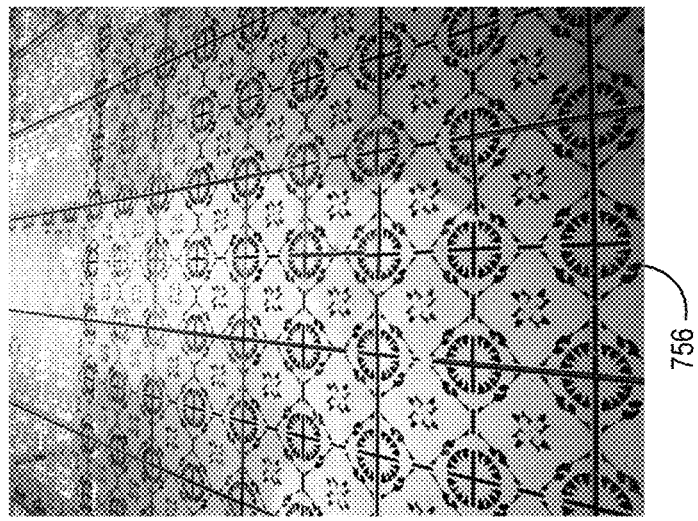
Figure 7B:
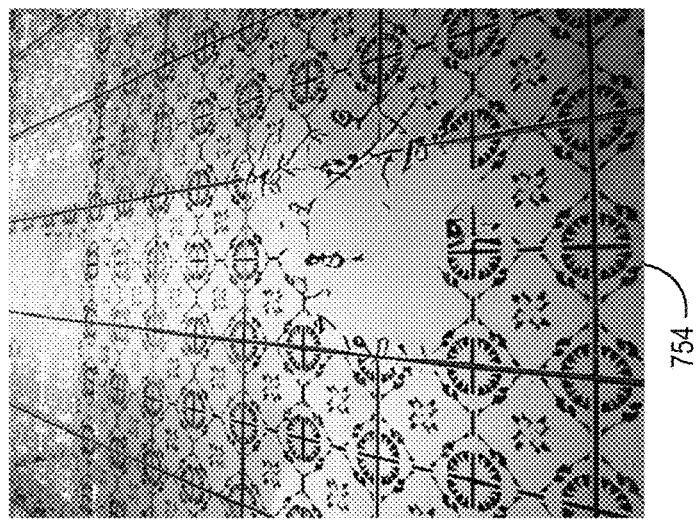
Figure 7B:
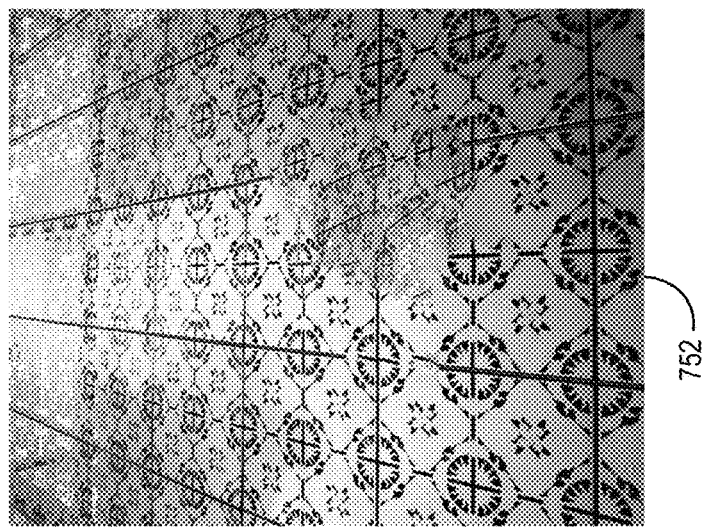

As mentioned above, in certain embodiments, the dual-guided inpainting system 102 generates more accurate inpainted digital images than prior systems, including state of the art systems. In particular, the dual-guided inpainting system 102 fills holes of digital images or accurately than conventional digital image editing systems, especially in cases where pixels are missing from areas of regular, repeating patterns. FIGS. 7A-7B illustrate example comparisons of inpainting digital images across various systems, demonstrating the improvements of the dual-guided inpainting system 102 in accordance with one or more embodiments.

As illustrated in FIG. 7A, the inpainted digital images 704, 706, and 708 are all generated by filling the hole of grayed out or missing pixels in the digital image 702 (e.g., within the boxed portion of the digital image 702). For example, the digital image 704 is generated utilizing a conventional Photoshop Content-Aware Fill (CAF) model. The digital image 706 is generated utilizing a CoModGAN model, as described by S. Zhao et al. in *Large Scale Image Completion via Co-Modulated Generative Adversarial Networks*, arXiv:2103.10428, Int'l Conf. on Learning Representations (2021). Additionally, the digital image 708 is generated utilizing the dual-guided inpainting system 102 described herein.

As illustrated in FIG. 7A, the dual-guided inpainting system 102 generates the digital image 708 with visible improvements over the digital image 704 and the digital image 706. Indeed, the digital image 704 and the digital image 706 each depict pixels that poorly align with the patterned floor tiles and that result in an unconvincing, inaccurate image. By contrast, the digital image 708 depicts pixels for the floor tiles that align much more accurately and that are much less visually jarring.

Likewise, as illustrated in FIG. 7B, the dual-guided inpainting system 102 provides similar improvements in generating the digital image 756. As shown, the digital image 752 is generated from the CAF system, and the digital image 754 is generated from the CoModGAN system, while the digital image 756 is generated utilizing the dual-guided inpainting system 102. Comparing the digital image 756 (as generated by the dual-guided inpainting system 102), the digital image 756 depicts much smoother, more realistic inpainted pixels that align much better with the pattern of the floor tiles. Indeed, due to the limitations of prior systems, the digital images 752 and 754 are unrealistic and include pixels that do not fit the hole, while the digital image 756 depicts much better, more believable results.

Figure 8A:
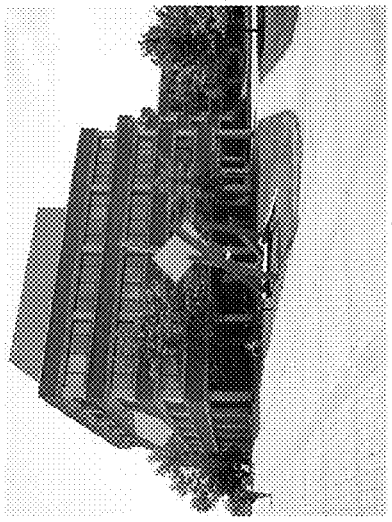
FIGS. 8A-8B illustrate ablation study results that illustrates the improvements provided by each of the plane panoptic segmentation map and the plane grouping map in isolation in accordance with one or more embodiments.
Figure 8A:
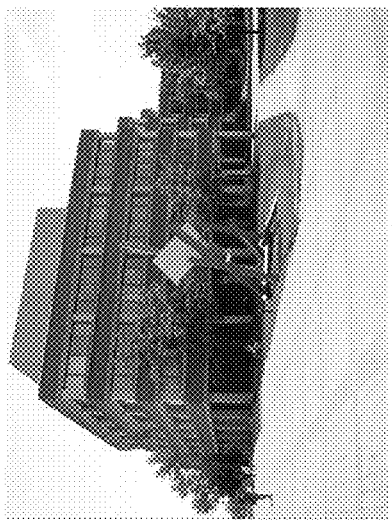
Figure 8A:
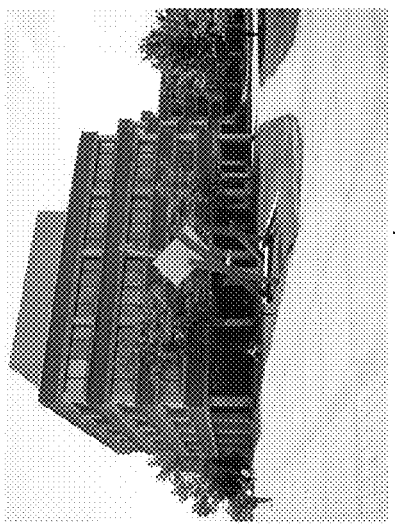

As shown by FIGS. 7A-7B, by utilizing the plane panoptic segmentation map and the plane grouping map as an appearance guide and as a geometric guide, respectively, the dual-guided inpainting system 102 provides improvements over the state of the art inpainting systems. FIG. 8A illustrates the results of an ablation study that shows how the use of the plane grouping map as a geometric guide alone (i.e., without the use of the plane panoptic segmentation map as an appearance guide) provides improvements over state of art inpainting systems. In particular, FIG. 8A illustrates an image with a hole 802, an image with the hole filled 804 using the inpainting model of *Image Completion Using Planar Structure Guidance*, and an image with the hole filled 806 by the dual-guided inpainting system 102 using the plane grouping map as a geometric guide without the use of the plane panoptic segmentation map as an appearance guide. As shown by a comparison of the regions of image 804 to image 806 corresponding to the hole of image 802, the image 806 has a much more plausible result while the image 804 includes obvious misaligned artifacts. As such, the use of the plane grouping map as a geometric guide alone provides an appreciable improvement over the state of the art.

Figure 8B:
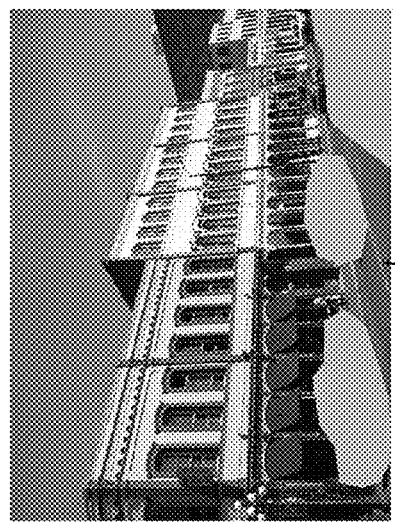
Figure 8B:
Figure 8B:

FIG. 8B illustrates the results of an ablation study that shows how the use of the plane panoptic segmentation map as an appearance guide alone (i.e., without the use of the use of the plane grouping map as a geometric guide) provides improvements over state of art inpainting systems. In particular, FIG. 8B illustrates an image with holes 812, an image with the holes filled 814 using the inpainting model of *Image Completion Using Planar Structure Guidance*, and an image with the holes filled 816 by the dual-guided inpainting system 102 using the plane panoptic segmentation map an appearance guide without the use of the plane grouping map as a geometric guide. As shown by a comparison of the regions of image 814 corresponding to the holes of image 812 to image 816, the image 816 has a much more plausible result while the image 814 includes obvious misaligned artifacts. As such, the use of the plane panoptic segmentation map as an appearance guide alone provides an appreciable improvement over the state of the art.

Figure 9:
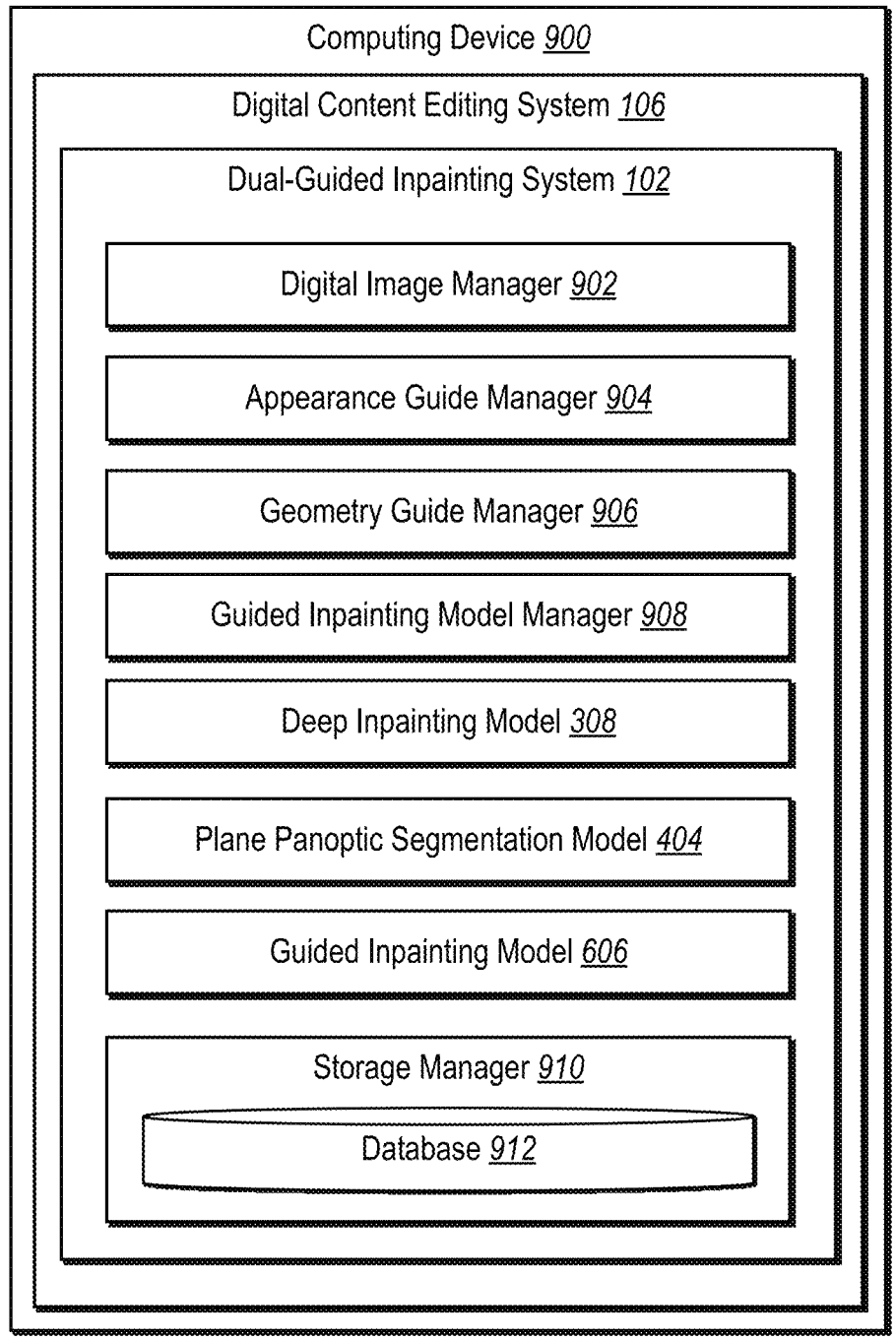
FIG. 9 illustrates a schematic diagram of a dual-guided inpainting system in accordance with one or more embodiments.

Looking now to FIG. 9, additional detail will be provided regarding components and capabilities of the dual-guided inpainting system 102. Specifically, FIG. 9 illustrates an example schematic diagram of the dual-guided inpainting system 102 on an example computing device 900 (e.g., one or more of the client device 108 and/or the server(s) 104). As shown in FIG. 9, the dual-guided inpainting system 102 includes a digital image manager 902, an appearance guide manager 904, a geometry guide manager 906, a guided inpainting model manager 908, and a storage manager 910.

As just mentioned, the dual-guided inpainting system 102 includes a digital image manager 902. In particular, the digital image manager 902 manages, maintains, accesses, identifies, receives, or obtains digital images. For example, the digital image manager 902 receives a digital image from a client device 108 that includes one or more holes for filling with a guided inpainting model. In some cases, the digital image manager 902 facilitates user interaction with a digital image via a digital image editing application to remove objects (e.g., creating holes) and/or fill holes of missing or flawed pixels. In certain embodiments, the digital image manager 902 downsamples a digital image and utilizes a deep inpainting model to generate a preliminary inpainted digital image at a downsampled resolution.

In addition, the dual-guided inpainting system 102 includes an appearance guide manager 904. In particular, the appearance guide manager 904 manages, maintains, trains, utilizes, implements, learns, generates, determines, or identifies an appearance guide. For example, the appearance guide manager 904 generates an appearance guide in the form of a plane panoptic segmentation map by utilizing a plane panoptic segmentation model (including one or more constituent models). In some cases, the appearance guide manager 904 generates a plane panoptic segmentation map that includes panoptic segments and plane segments, as described herein.

As shown, the dual-guided inpainting system 102 also includes a geometry guide manager 906. In particular, the geometry guide manager 906 manages, maintains, trains, utilizes, implements, learns, generate, determines, or identifies a geometry guide. For example, the geometry guide manager 906 generates a geometry guide in the form of a plane grouping map by grouping plane panoptic segments (or surface planes) into surface plane groups as described herein.

As further illustrated in FIG. 9, the dual-guided inpainting system 102 includes a guided inpainting model manager 908. In particular, the guided inpainting model manager 908 manages, maintains, trains, utilizes, implements, or applies a guided inpainting model to generate an inpainted digital image. For example, the guided inpainting model manager 908 utilizes a guided inpainting model to sample patches of a digital image according to a plane panoptic segmentation map and/or a plane grouping map. In some cases, the guided inpainting model manager 908 utilizes one or more optimization algorithms, such as an appearance guidance optimization algorithm, a geometry guidance optimization algorithm, and/or a regularity optimization algorithm, for sampling a digital image.

The dual-guided inpainting system 102 further includes a storage manager 910. The storage manager 910 operates in conjunction with or include one or more memory devices such as the database 912 (e.g., the database 112) that store various data such as digital images, a deep inpainting neural network, a plane panoptic segmentation model, and/or a guided inpainting model. The storage manager 910 (e.g., via a non-transitory computer memory/one or more memory devices) stores and maintains data associated with generating inpainted digital images, including plane panoptic segmentation maps and/or plane grouping maps.

In one or more embodiments, each of the components of the dual-guided inpainting system 102 are in communication with one another using any suitable communication technologies. Additionally, the components of the dual-guided inpainting system 102 is in communication with one or more other devices including one or more client devices described above. It will be recognized that although the components of the dual-guided inpainting system 102 are shown to be separate in FIG. 9, any of the subcomponents may be combined into fewer components, such as into a single component, or divided into more components as may serve a particular implementation. Furthermore, although the components of FIG. 9 are described in connection with the dual-guided inpainting system 102, at least some of the components for performing operations in conjunction with the dual-guided inpainting system 102 described herein may be implemented on other devices within the environment.

The components of the dual-guided inpainting system 102 can include software, hardware, or both. For example, the components of the dual-guided inpainting system 102 can include one or more instructions stored on a computer-readable storage medium and executable by processors of one or more computing devices (e.g., the computing device 900). When executed by the one or more processors, the computer-executable instructions of the dual-guided inpainting system 102 can cause the computing device 900 to perform the methods described herein. Alternatively, the components of the dual-guided inpainting system 102 can comprise hardware, such as a special purpose processing device to perform a certain function or group of functions. Additionally, or alternatively, the components of the dual-guided inpainting system 102 can include a combination of computer-executable instructions and hardware.

Furthermore, the components of the dual-guided inpainting system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the dual-guided inpainting system 102 may be implemented as part of a stand-alone application on a personal computing device or a mobile device. Alternatively, or additionally, the components of the dual-guided inpainting system 102 may be implemented in any application that allows creation and delivery of marketing content to users, including, but not limited to, applications in ADOBE® EXPERIENCE MANAGER and CREATIVE CLOUD®, such as ADOBE® STOCK, PHOTOSHOP®, LIGHTROOM®, and INDESIGN®. "ADOBE," "ADOBE EXPERIENCE MANAGER," "CREATIVE CLOUD," "ADOBE STOCK," "PHOTOSHOP," "LIGHTROOM," and "INDESIGN" are either registered trademarks or trademarks of Adobe Inc. in the United States and/or other countries.

FIGS. 1-9 the corresponding text, and the examples provide a number of different systems, methods, and non-transitory computer readable media for generating an inpainted digital image utilizing a guided inpainting model guided by a plane panoptic segmentation map and a plane grouping map. In addition to the foregoing, embodiments can also be described in terms of flowcharts comprising acts for accomplishing a particular result. For example, FIG. 10 illustrates flowcharts of example sequences or series of acts in accordance with one or more embodiments.

Figure 10:
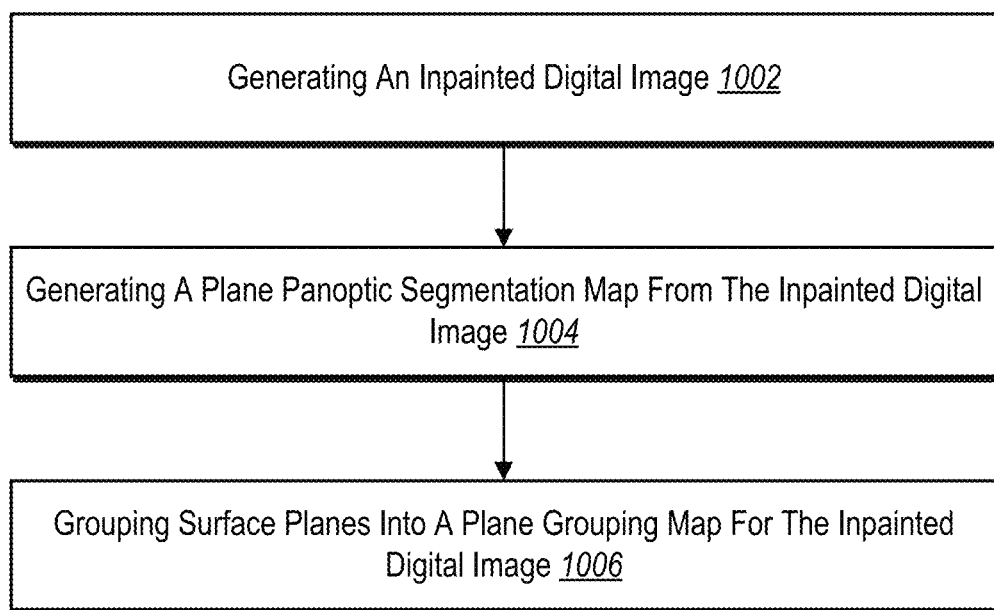
FIG. 10 illustrates a flowchart of a series of acts for generating a modified inpainted digital image according to a plane panoptic segmentation map and a plane grouping map in accordance with one or more embodiments.

While FIG. 10 illustrates acts according to various embodiments, alternative embodiments may omit, add to, reorder, and/or modify any of the acts shown in FIG. 10. The acts of FIG. 10 can be performed as part of a method. Alternatively, a non-transitory computer readable medium can comprise instructions, that when executed by one or more processors, cause a computing device to perform the acts of FIG. 10. In still further embodiments, a system can perform the acts of FIG. 10. Additionally, the acts described herein may be repeated or performed in parallel with one another or in parallel with different instances of the same or other similar acts.

FIG. 10 illustrates an example series of acts 1000 of generating an inpainted digital image utilizing a guided inpainting model guided by a plane panoptic segmentation map and a plane grouping map. In particular, the series of acts 1000 includes an act 1002 of generating an inpainted digital image. For example, the act 1002 involves generating an inpainted digital image by filling one or more holes of a digital image utilizing a deep inpainting model.

In addition, the series of acts 1000 includes an act 1004 of generating a plane panoptic segmentation map from the inpainted digital image. In particular, the act 1004 involves generating, from the inpainted digital image utilizing a plane panoptic segmentation model, a plane panoptic segmentation map indicating plane panoptic segments associated with pixels of the inpainted digital image. For example, the act 1004 includes generating, for a pixel within a plane panoptic segment of the inpainted digital image, a triplet label comprising a semantic class associated with the plane panoptic segment, an instance identification associated with the plane panoptic segment, and a surface plane identification associated with the plane panoptic segment.

In one or more embodiments, the act 1004 includes generating, from the inpainted digital image utilizing a panoptic segmentation model (e.g., a panoptic segmentation neural network), panoptic segments indicating semantic classes and instance identifications associated with pixels of the inpainted digital image. In the same or other embodiments, the act 1004 involves generating, from the inpainted digital image utilizing a plane detection model (e.g., a plane detection neural network), surface plane segments indicating surface planes associated with the pixels of the inpainted digital image. Additionally (or alternatively, the act 1004 can include combining the panoptic segments and the surface plane segments into the plane panoptic segments of the plane panoptic segmentation map. Indeed, the act 1004 can include combining the panoptic segments and the surface plane segments into a plane panoptic segmentation map indicating semantic classes, instance identifications, and surface planes associated with the pixels of the inpainted digital image. In certain cases, combining the panoptic segments and the surface plane segments includes identifying, from the panoptic segments, a multi-plane structure within the inpainted digital image and dividing the multi-plane structure into additional regions according to the surface plane segments of the inpainted digital image.

As further illustrated in FIG. 10, the series of acts 1000 can include an act 1006 of grouping surface planes (or plane panoptic segments) into a surface plane group for the inpainted digital image. In particular, the act 1006 involves grouping, from the plane panoptic segmentation map, the plane panoptic segments associated with the pixels of the inpainted digital image into a plane grouping map indicating different surface plane groups depicted within the inpainted digital image. In some cases, the act 1006 involves determining respective normal vectors for the plane panoptic segments and grouping the plane panoptic segments into the surface plane groups according to the respective normal vectors. In one or more embodiments, the act 1006 involves comparing normal vectors associated with individual plane panoptic segments within the plane panoptic segmentation map and grouping the plane panoptic segments into surface plane groups according to comparing the normal vectors. In certain implementations, the act 1006 involves clustering lines within the inpainted digital image according to distinct vanishing points associated with the lines and assigning normal vectors to detected surface planes according to the clustering.

In some cases, the series of acts 1000 does not necessarily include the act 1006. In these or other cases, the series of acts 1000 includes an act of generating a modified inpainted digital image (e.g., from the plane panoptic segmentation map and/or the plane grouping map). For example, the series of acts 1000 includes an act of generating a modified inpainted digital image utilizing a guided inpainting model guided by the plane panoptic segmentation map and/or the plane grouping map. Generating the modified inpainted digital image can include utilizing the guided inpainting model to sample regions of the digital image according to an appearance guidance optimization algorithm and a regularity optimization algorithm.

In certain implementations, generating a modified inpainted digital image involves utilizing the guided inpainting model to sample patches of a digital image according to an appearance guidance optimization algorithm that constrains sampling according to structure separation indicated by the plane panoptic segmentation map. In these or other implementations, generating a modified inpainted digital image involves utilizing the guided inpainting model to sample patches of a digital image according to a regularity optimization algorithm that facilitates sampling patches in orthogonal directions from regularity modes and in an orthogonal direction from a target patch.

Generating the modified inpainted digital image can include filling a hole of missing pixels within a visual repeating pattern depicted within the digital image. In certain cases, generating the modified inpainted digital image includes utilizing the guided inpainting model guided to sample patches of the digital image according to offset vectors between patches that satisfy a patch similarity threshold. In the same or other cases, generating the modified inpainted digital image includes utilizing the guided inpainting model guided to sample patches of the digital image according to an appearance guidance optimization algorithm, a geometry guidance optimization algorithm, and a regularity optimization algorithm.

In one or more embodiments, the series of acts 1000 includes an act of learning parameters for an inpainting neural network from one or more of the plane panoptic segmentation map or the plane grouping map. In certain cases, the series of acts 1000 includes acts of generating a downsampled digital image by downsampling the digital image from an initial resolution to a downsampled resolution, generating the inpainted digital image by filling one or more holes of the downsampled digital image utilizing the deep inpainting model, upsampling the plane panoptic segmentation map to the initial resolution, and generating the modified inpainted digital image by filling a hole within the digital image utilizing the guided inpainting model guided by the plane panoptic segmentation map at the initial resolution.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
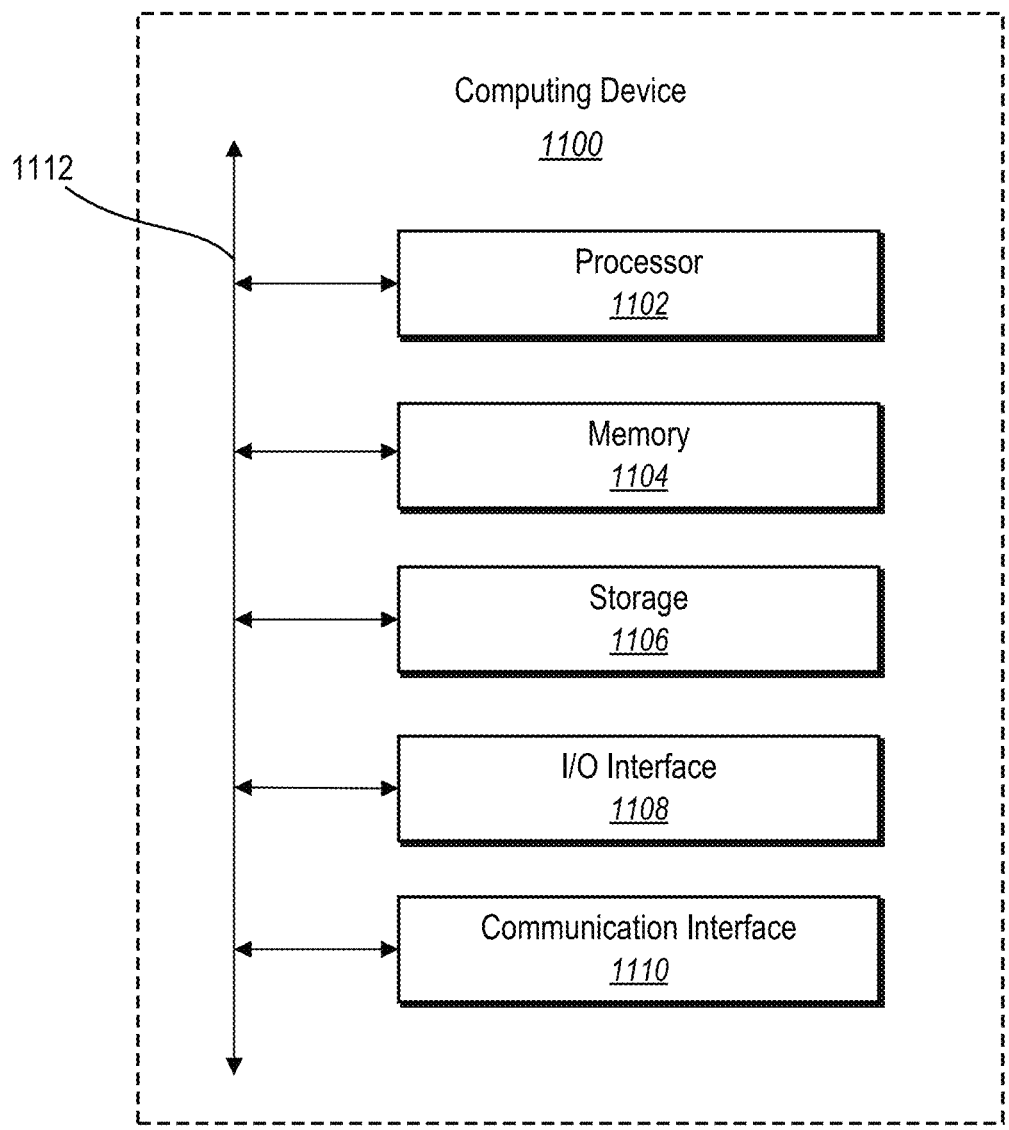
FIG. 11 illustrates a block diagram of an example computing device in accordance with one or more embodiments.

FIG. 11 illustrates, in block diagram form, an example computing device 1100 (e.g., the computing device 900, the client device 108, and/or the server(s) 104) that may be configured to perform one or more of the processes described above. One will appreciate that the dual-guided inpainting system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
   receive a digital image depicting one or more holes; and
   generate, from the digital image utilizing a plane panoptic segmentation model, a plane panoptic segmentation map indicating plane panoptic segments associated with pixels of the digital image, wherein the plane panoptic segmentation map comprises a fusion of panoptic segments and surface plane segments depicted in the digital image; and
   generate a modified inpainted digital image according to the plane panoptic segmentation map.

2. The non-transitory computer readable medium of claim 1, further comprising instructions that, when executed by the at least one processor, cause the computing device to generate a plane grouping map by grouping the plane panoptic segments from the plane panoptic segmentation map into surface plane groups.

3. The non-transitory computer readable medium of claim 2, further comprising instructions that, when executed by the at least one processor, cause the computing device to generate the modified inpainted digital image utilizing a guided inpainting model guided by the plane panoptic segmentation map and the plane grouping map.

4. The non-transitory computer readable medium of claim 1, further comprising instructions that, when executed by the at least one processor, cause the computing device to generate the plane panoptic segmentation map by generating, for a pixel within a plane panoptic segment of the digital image, a triplet label comprising a semantic class associated with the plane panoptic segment, an instance identification associated with the plane panoptic segment, and a surface plane identification associated with the plane panoptic segment.

5. The non-transitory computer readable medium of claim 1, further comprising instructions that, when executed by the at least one processor, cause the computing device to group the plane panoptic segments into a plane grouping map by:
- determining respective normal vectors for the plane panoptic segments; and
- grouping the plane panoptic segments into surface plane groups according to the respective normal vectors.

6. The non-transitory computer readable medium of claim 1, further comprising instructions that, when executed by the at least one processor, cause the computing device to generate the plane panoptic segmentation map by:
- generating, from the digital image utilizing a panoptic segmentation neural network, panoptic segments indicating semantic classes and instance identifications associated with pixels of the digital image;
- generating, from the digital image utilizing a plane detection neural network, surface plane segments indicating surface planes associated with the pixels of the digital image; and
- combining the panoptic segments and the surface plane segments into the plane panoptic segments of the plane panoptic segmentation map.

7. The non-transitory computer readable medium of claim 1, further comprising instructions that, when executed by the at least one processor, cause the computing device to learn parameters for an inpainting neural network from the plane panoptic segmentation map.

8. A system comprising:
- one or more memory devices comprising a digital image comprising one or more holes, a panoptic segmentation model, a plane detection model, and a guided inpainting model; and
- one or more processors configured to cause the system to:
- generate, from the digital image utilizing the panoptic segmentation model, panoptic segments indicating semantic classes and instance identifications associated with pixels of the digital image;
- generate, from the digital image utilizing the plane detection model, surface plane segments indicating surface planes associated with the pixels of the digital image;
- combine the panoptic segments and the surface plane segments into a plane panoptic segmentation map indicating semantic classes, instance identifications, and surface planes associated with the pixels of the digital image; and
- generate an inpainted digital image that fills the one or more holes utilizing the guided inpainting model guided by the plane panoptic segmentation map.

9. The system of claim 8, wherein the one or more processors are further configured to cause the system to generate, from the plane panoptic segmentation map, a plane grouping map indicating different surface plane groups depicted within the digital image.

10. The system of claim 9, wherein the one or more processors are further configured to cause the system to generate the inpainted digital image utilizing the guided inpainting model guided by the plane panoptic segmentation map and the plane grouping map.

11. The system of claim 8, wherein the one or more processors are further configured to cause the system to combine the panoptic segments and the surface plane segments by:
- identifying, from the panoptic segments, a multi-plane structure within the digital image; and
- dividing the multi-plane structure into additional regions according to the surface plane segments of the digital image.

12. The system of claim 8, wherein the one or more processors are further configured to cause the system to generate a plane grouping map from the plane panoptic segmentation map by:
- comparing normal vectors associated with individual plane panoptic segments within the plane panoptic segmentation map; and
- grouping the plane panoptic segments into surface plane groups according to comparing the normal vectors.

13. The system of claim 8, wherein the one or more processors are further configured to cause the system to generate a plane grouping map from the digital image by:
- clustering lines within the digital image according to distinct vanishing points associated with the lines; and
- assigning normal vectors to detected surface planes according to the clustering.

14. The system of claim 8, wherein the one or more processors are further configured to cause the system to generate the inpainted digital image by utilizing the guided inpainting model to sample patches of a digital image according to an appearance guidance optimization algorithm that constrains sampling according to structure separation indicated by the plane panoptic segmentation map.

15. The system of claim 8, wherein the one or more processors are further configured to cause the system to generate the inpainted digital image by utilizing the guided inpainting model to sample patches of a digital image according to a regularity optimization algorithm that facilitates sampling patches in orthogonal directions from regularity modes and in an orthogonal direction from a target patch.

16. A computer-implemented method comprising:
- generating an inpainted digital image from a digital image utilizing a deep inpainting model;
- performing a step for generating a plane panoptic segmentation map indicating panoptic segments and surface plane segments within the inpainted digital image; and
- generating a modified inpainted digital image utilizing a guided inpainting model guided by the plane panoptic segmentation map.

17. The computer-implemented method of claim 16, further comprising:
- generating a downsampled digital image by downsampling the digital image from an initial resolution to a downsampled resolution;
- generating the inpainted digital image by filling one or more holes of the downsampled digital image utilizing the deep inpainting model;
- upsampling the plane panoptic segmentation map to the initial resolution; and
- generating the modified inpainted digital image by filling a hole within the digital image utilizing the guided inpainting model guided by the plane panoptic segmentation map at the initial resolution.

18. The computer-implemented method of claim 16, generating the modified inpainted digital image comprises filling a hole of missing pixels within a visual repeating pattern depicted within the digital image.

19. The computer-implemented method of claim 16, further comprising generating the modified inpainted digital image by utilizing the guided inpainting model guided to sample patches of the digital image according to offset vectors between patches that satisfy a patch similarity threshold.

20. The computer-implemented method of claim 16, further comprising generating the modified inpainted digital image by utilizing the guided inpainting model guided to sample patches of the digital image according to an appearance guidance optimization algorithm, a geometry guidance optimization algorithm, and a regularity optimization algorithm.

* * * * *